(12) United States Patent
Yanagawa

(10) Patent No.: US 11,565,335 B2
(45) Date of Patent: Jan. 31, 2023

(54) BRAZING METHOD FOR BRAZING MATERIAL FORMED OF ALUMINUM ALLOY IN INERT GAS ATMOSPHERE WITHOUT USING FLUX

(71) Applicant: UACJ Corporation, Tokyo (JP)

(72) Inventor: Yutaka Yanagawa, Tokyo (JP)

(73) Assignee: UACJ CORPORATION, Tokyo (JP)

(*) Notice: Subject to any disclaimer, the term of this patent is extended or adjusted under 35 U.S.C. 154(b) by 176 days.

(21) Appl. No.: 16/966,180

(22) PCT Filed: Jan. 30, 2019

(86) PCT No.: PCT/JP2019/003145
§ 371 (c)(1),
(2) Date: Jul. 30, 2020

(87) PCT Pub. No.: WO2019/151315
PCT Pub. Date: Aug. 8, 2019

(65) Prior Publication Data
US 2021/0031289 A1 Feb. 4, 2021

(30) Foreign Application Priority Data
Feb. 2, 2018 (JP) .............................. JP2018-016848

(51) Int. Cl.
*B23K 1/008* (2006.01)
*B23K 1/00* (2006.01)
(Continued)

(52) U.S. Cl.
CPC .............. *B23K 1/0012* (2013.01); *B23K 1/19* (2013.01); *B23K 3/087* (2013.01);
(Continued)

(58) Field of Classification Search
CPC .. B23K 2101/14; B23K 1/0012; B23K 3/087; F28F 2275/045
See application file for complete search history.

(56) References Cited

U.S. PATENT DOCUMENTS 3,726,466 A * 4/1973 Vedder ................. B23K 1/0012
29/726
3,941,293 A * 3/1976 Chartet .................. B23K 1/008
228/183
(Continued)

FOREIGN PATENT DOCUMENTS

DE 102005055897 A1 * 5/2007 ........... B23K 1/0012
DE 10 2006 031 490 A1 1/2008
(Continued)

OTHER PUBLICATIONS

International Search Report dated Apr. 16, 2019, issued in counterpart International Application No. PCT/JP2019/003145. (2 pages).
(Continued)

*Primary Examiner* — Erin B Saad
*Assistant Examiner* — Carlos J Gamino
(74) *Attorney, Agent, or Firm* — WHDA, LLP

(57) ABSTRACT

A brazing method for brazing a material without using a flux includes performing brazing in an inert gas atmosphere, in a state in which the material to be brazed is covered with a cover member formed of an upper cover portion covering the whole upper portion of the material to be brazed and side cover portions covering at least some of the side portions of the material to be brazed, with the upper cover portion contacting the upper portion of the material to be brazed, and the material to be brazed and the cover member are held with a heat transmission promoting member formed of an upper heat transmission promoting portion and a lower heat transmission promoting portion, with the upper heat transmission promoting portion contacting the upper cover portion, and
(Continued)

with the lower heat transmission promoting portion contacting the lower portion of the material to be brazed.

8 Claims, 7 Drawing Sheets

(51) Int. Cl.
  *B23K 1/19* (2006.01)
  *B23K 3/08* (2006.01)
  *B23K 103/10* (2006.01)
  *B23K 101/14* (2006.01)

(52) U.S. Cl.
  CPC ...... *B23K 2101/14* (2018.08); *B23K 2103/10* (2018.08); *F28F 2275/045* (2013.01)

(56) References Cited

U.S. PATENT DOCUMENTS

| | | | | |
|---|---|---|---|---|
| 4,053,969 | A | * | 10/1977 | Bayard ................... F28F 3/027 228/183 |
| 4,128,235 | A | * | 12/1978 | Gersbacher ............ B23K 3/087 228/183 |
| 4,701,127 | A | * | 10/1987 | Dockus .................. B23K 1/008 432/198 |
| 4,911,351 | A | * | 3/1990 | Ishikawa .................. B23K 1/19 427/310 |
| 2015/0314405 | A1 | * | 11/2015 | Na ...................... B23K 37/0408 269/254 R |
| 2016/0325367 | A1 | * | 11/2016 | Eckhard ............... B23K 35/288 |
| 2017/0320170 | A1 | * | 11/2017 | Yanagawa ............. B23K 35/28 |
| 2019/0217409 | A1 | * | 7/2019 | Kirkham .................. F28F 9/02 |

FOREIGN PATENT DOCUMENTS

| | | | |
|---|---|---|---|
| DE | 102017222870 A1 | * | 6/2019 |
| DE | 102020006028 A1 | * | 4/2021 |
| JP | 55-30319 A | | 3/1980 |
| JP | 5-88770 U | | 12/1993 |
| JP | 9-85433 A | | 3/1997 |
| JP | 2004-25297 A | | 1/2004 |
| JP | 2006-35232 A | | 2/2006 |
| JP | 2006043735 A | * | 2/2006 |
| JP | 2006-175500 A | | 7/2006 |
| JP | 2017-136610 A | | 8/2017 |
| NO | 2014/030416 A1 | | 2/2014 |
| TW | I229019 B | | 3/2005 |

OTHER PUBLICATIONS

Office Action dated Jul. 14, 2021, issued in counterpart CN Application No. 201980011066.1, with English translation. (24 pages).

* cited by examiner

[Fig.1]
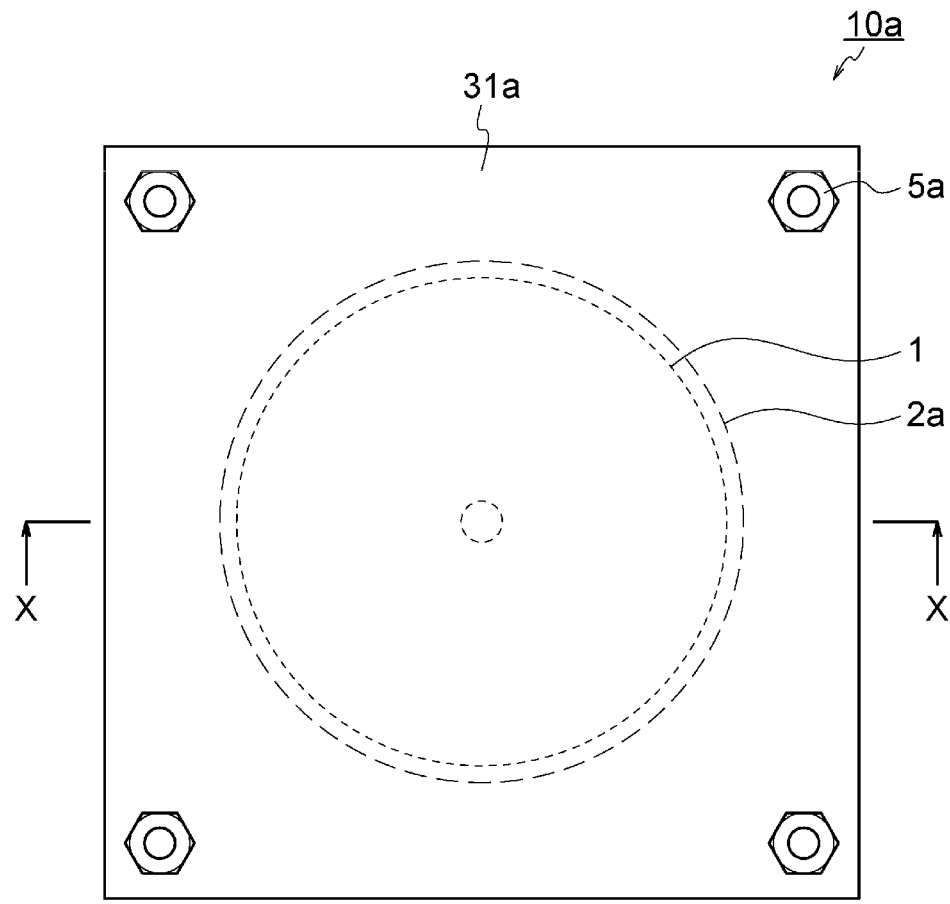
[Fig.2]
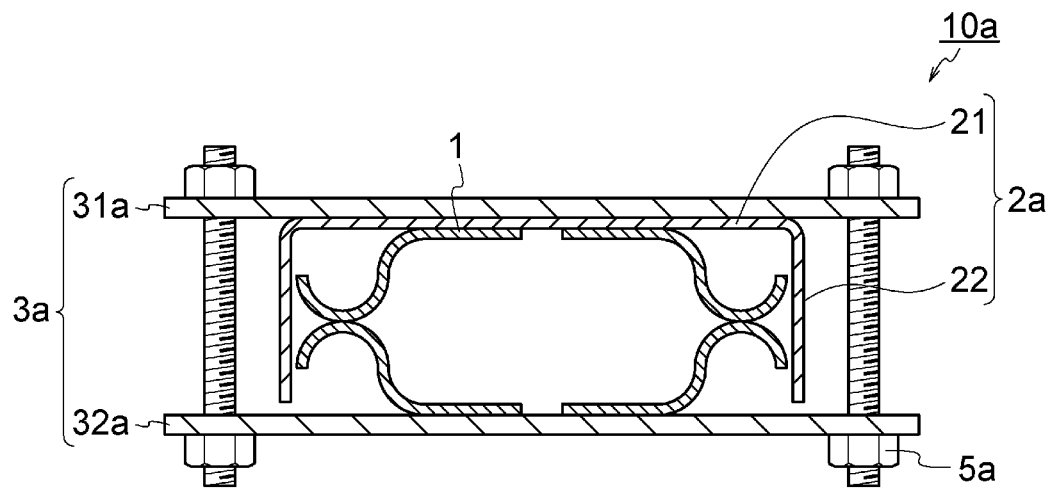

[Fig.3]
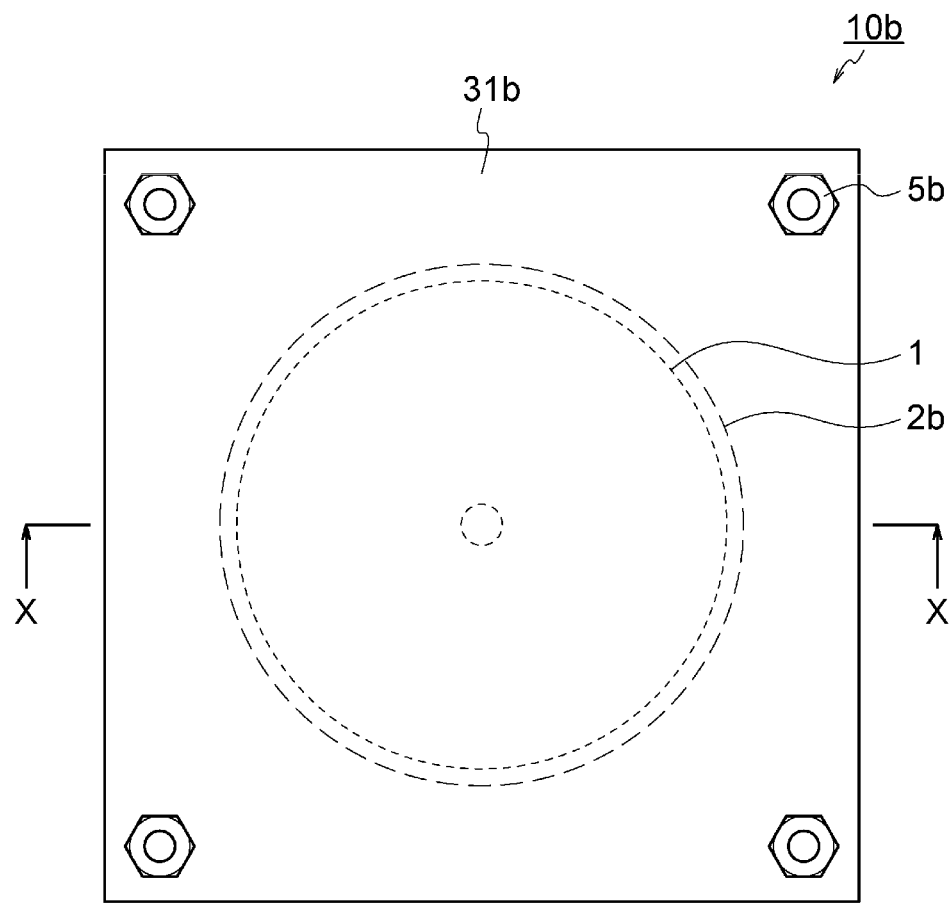
[Fig.4]
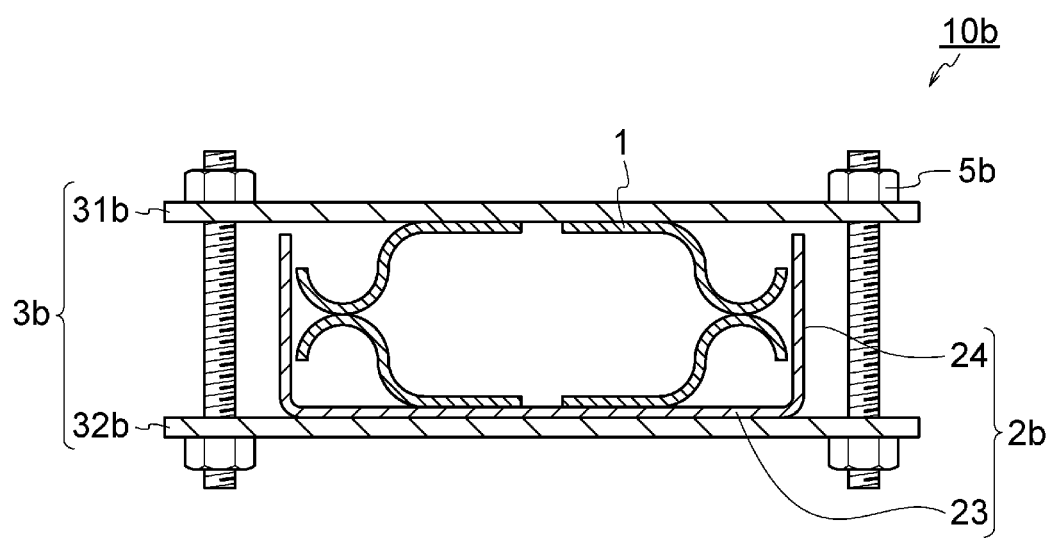

[Fig.5]
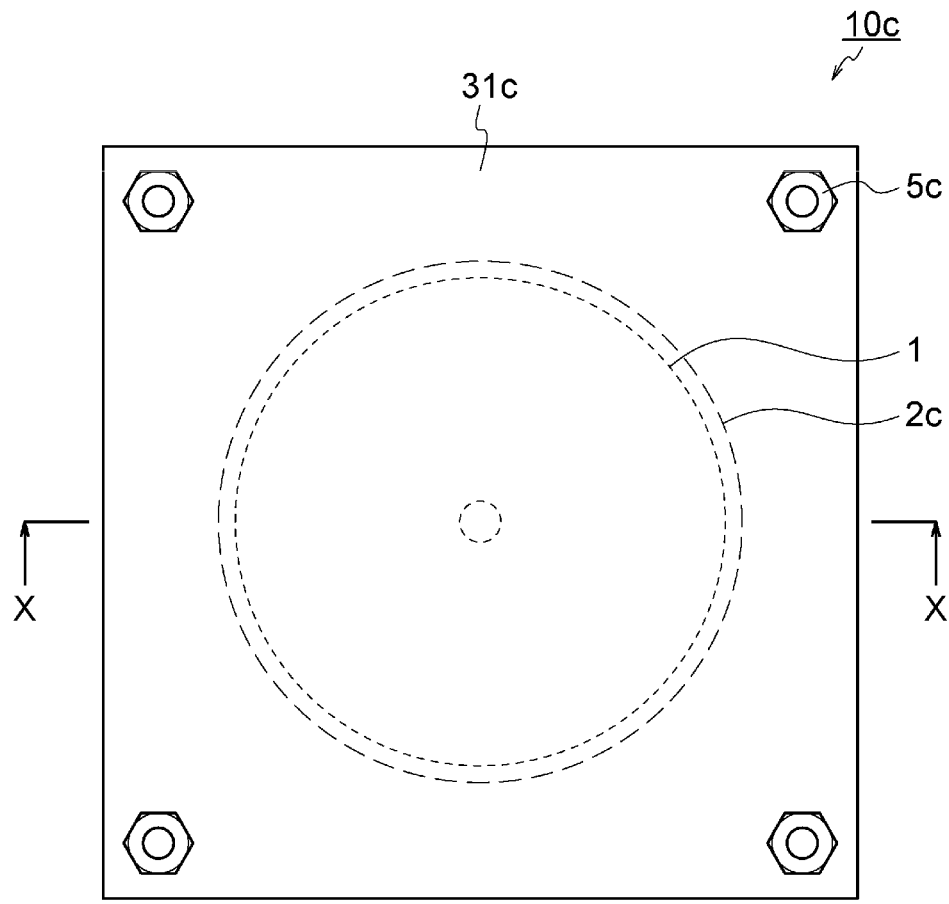
[Fig.6]
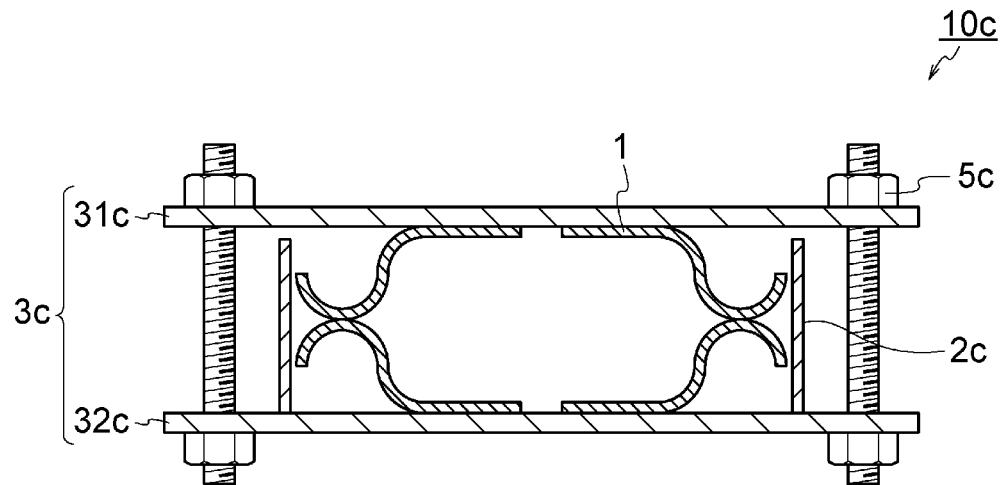

[Fig.7]
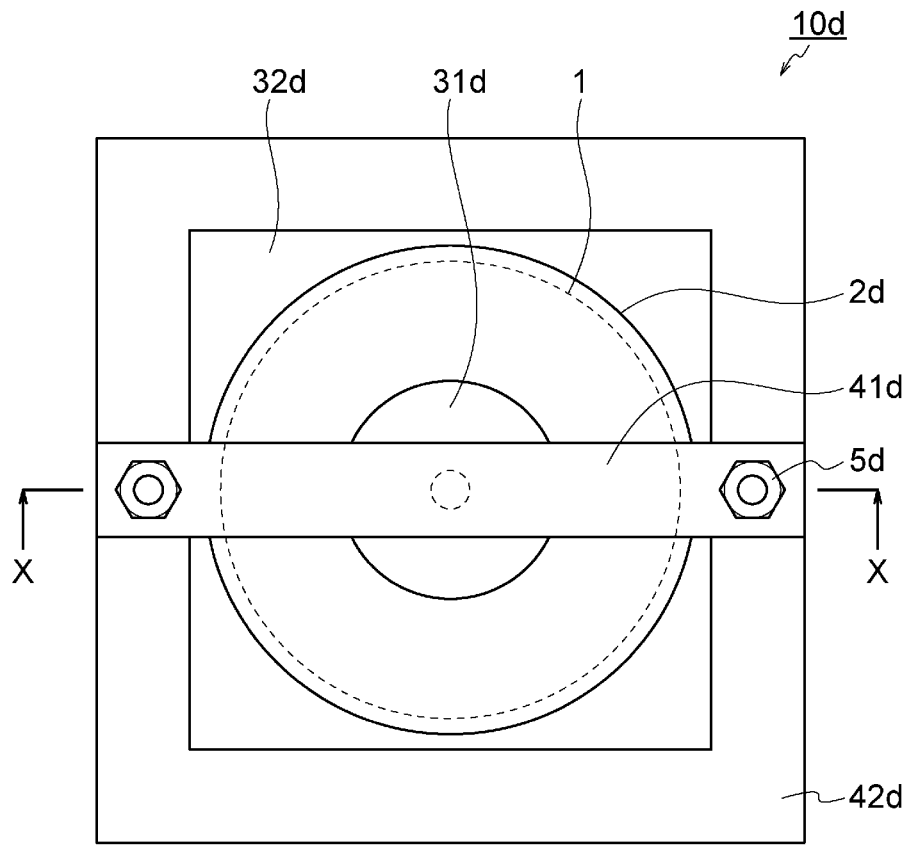
[Fig.8]
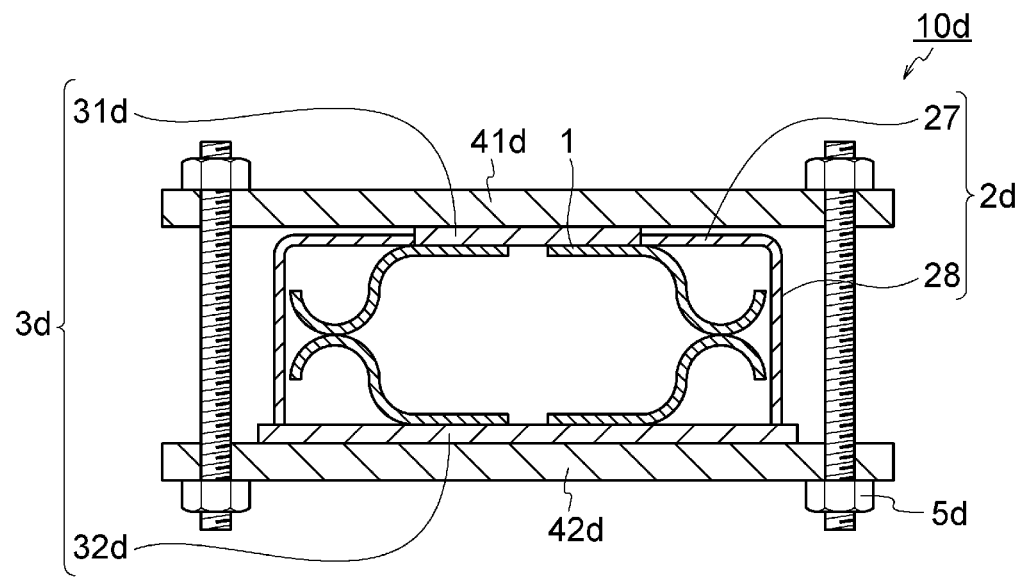

[Fig.9]
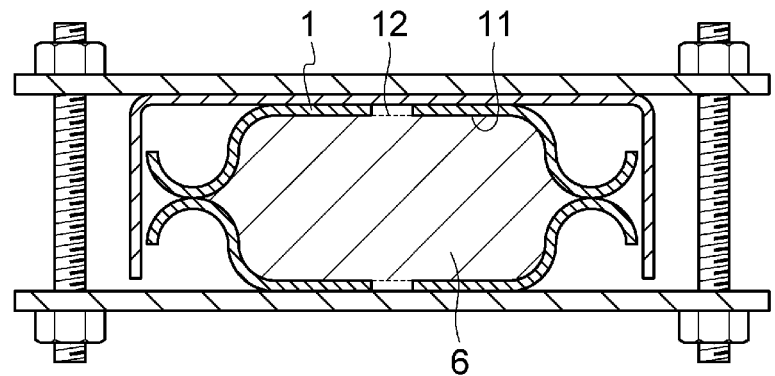
[Fig.10]
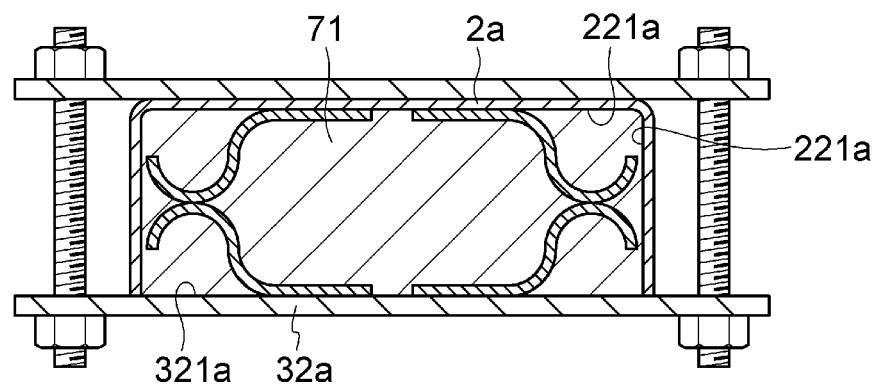
[Fig.11]
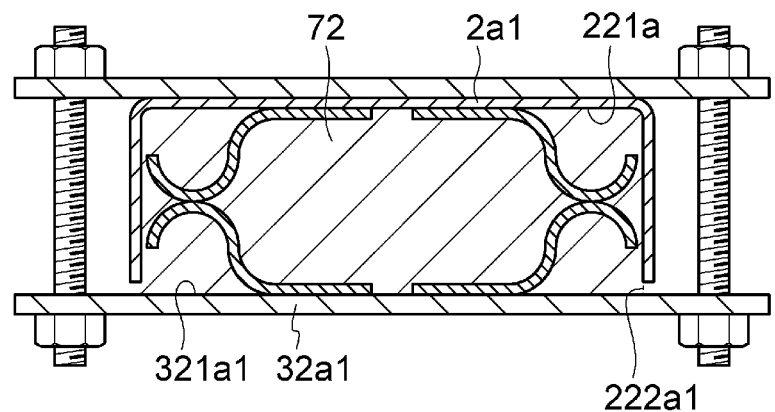

[Fig.12]
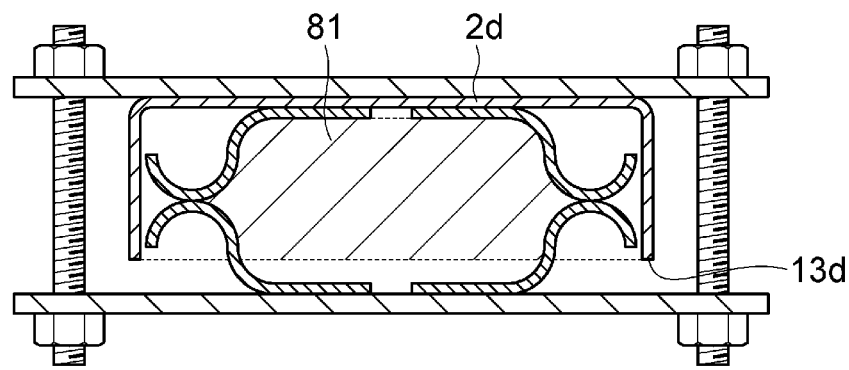
[Fig.13]
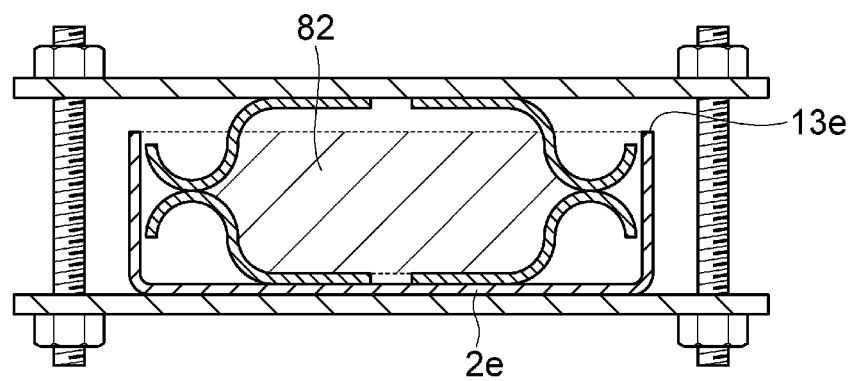
[Fig.14]
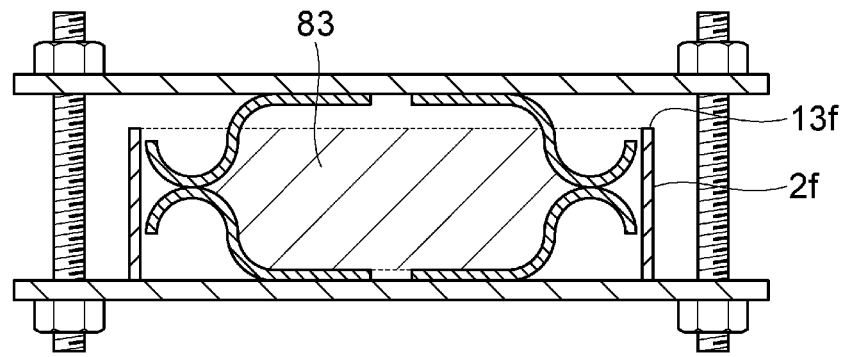

[Fig.15]
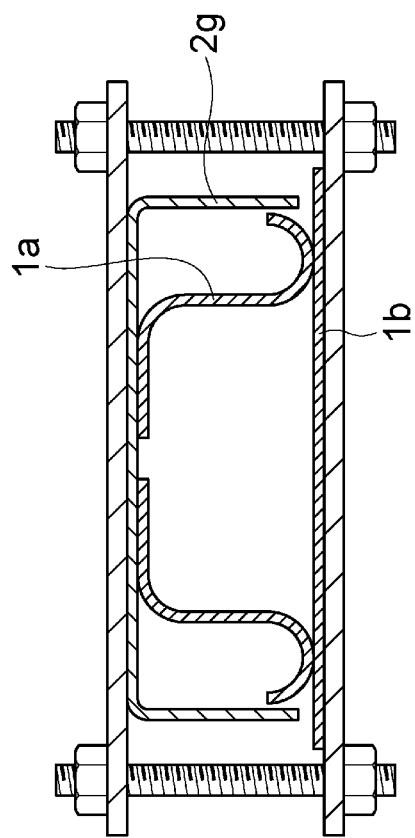

BRAZING METHOD FOR BRAZING MATERIAL FORMED OF ALUMINUM ALLOY IN INERT GAS ATMOSPHERE WITHOUT USING FLUX

TECHNICAL FIELD

The present invention relates to a brazing method for brazing a material to be brazed formed of an aluminum alloy in an inert gas atmosphere without using a flux.

BACKGROUND ART

Aluminum materials have high thermal conductivity and light weight, and frequently used for coolers, such as the coolers mounted on automobiles.

These coolers have a structure in which coolant, such as water, is circulated through a channel formed of a combination of members to move and radiate heat. The members forming the cooler is metallically bonded by brazing.

As an aluminum material subjected to brazing, a brazing sheet is used in which an aluminum alloy sheet serving as a core material is cladded with a brazing material on its one side surface or both side surfaces. An aluminum alloy having a melting temperature of exceeding 620° C. is used as a core material alloy of typical brazing sheets, and an Al—Si alloy having a melting start temperature of 577° C. is used as a brazing material to be cladded.

To produce a heat exchanger by brazing, the brazing sheets are formed into shapes of heat exchanger members and then combined, and heated to a temperature of around 600° C. In this manner, only the brazing material portion of the brazing sheet is molten to be brazed with other members.

To enable brazing, an oxide film on the surface of the material needs to be broken. In brazing of aluminum, a flux is supplied to the brazing portion to break the oxide film. For example, generally, K—Al—F-based compound powder serving as a flux is suspended in water and/or a solvent, and applied to the brazing portion of the aluminum material. During increase in temperature of brazing, the flux is molten onto the brazing portion, covers the surface of the aluminum material, and breaks the oxide film existing on the surface. In addition, when the temperature is further increased, the Al—Si-based brazing material of the brazing sheet is molten and metallically bonds with the surface of the bonding target member, because the oxide films on the surface of the brazing material and the surface of the bonding target material are broken by the effect of the flux, and the brazing is completed.

In recent years, reduction in size and weight is required for heat exchangers for automobiles. To meet the requirements, materials having high strength and small thickness tend to be used as aluminum materials forming heat exchangers. Having Mg in the materials is effective to increase the strength of the aluminum materials, and use of aluminum materials containing Mg is desired also in heat exchangers.

However, when an aluminum material containing Mg is brazed under existence of a K—Al—F-based compound flux, the flux reacts with Mg on the surface of the material and generates a compound during heating for brazing. For this reason, the effect of the flux of removing the oxide film is lost, and brazing becomes impossible. For this reason, it is required to limit the Mg content in the aluminum material used for the brazing using a flux.

Methods accordingly having been proposed are the methods of performing brazing by heating an aluminum material containing Mg in an inert gas without using a flux. For example, Patent Literature 1 discloses a method for performing brazing without using a flux by covering the material to be brazed to suppress a flow of the atmosphere gas inside the cover and disposing an Mg supply source inside the cover. Patent Literature 2 discloses a method for performing brazing by using a brazing sheet formed of an aluminum alloy containing Mg in a constituent member to form a hollow structure. In this method, brazing is performed without applying a flux inside the hollow structure, and by applying a flux outside the hollow structure. Patent Literature 3 discloses a method for performing brazing without using a flux by heating the material to be brazed disposed in a furnace and covering the material to be brazed with a wind-shield jig heated in advance.

PRIOR ART LITERATURES

Patent Literatures

[Patent Literature 1] Japanese Patent Publication H9-85433-A
[Patent Literature 2] Japanese Patent Publication 2004-25297-A
[Patent Literature 3] Japanese Patent Publication 2006-35232-A

SUMMARY

Problem to be Solved

To enable brazing of an aluminum material, an oxide film on the surface of the material needs to be broken.

For this reason, in Patent Literature 1, Mg contained in the cover breaks the oxide film. However, enclosing the material with the cover impedes heat transmission from the high-temperature inert gas in the brazing furnace, shuts off radiant heat from the brazing furnace, and delays an increase in the temperature of the material to be brazed. In addition, even when the brazing atmosphere is an inert gas, a small quantity of oxygen exists in the atmosphere. Thus, the delay in the increase of the temperature prolongs the time of the material to be brazed exposed in the heated atmosphere. For this reason, Patent Literature 1 has a problem in which the time of the material to be brazed exposed in the heated atmosphere increases, a growth of the oxide film progresses, breakage of the oxide film with Mg becomes difficult, and consequently, good brazability may not be obtained.

In addition, in Patent Literature 2, because generation of the air flow is suppressed in the inside of the hollow structure, oxidization of the surface of the material does not progress, and brazing is possible. However, because the outside of the hollow structure is exposed to the atmosphere and the growth of the oxide film easily progresses, brazability decreases. For this reason, Patent Literature 2 has the problem that a flux still needs to be used for brazing of the outside of the hollow structure.

For this reason, in Patent Literature 3, the material to be brazed is heated as it is until brazing filler metal is molten, and the material to be brazed is covered with a wind-shield jig just before the brazing filler metal is molten, thereby obtaining good brazability even in a region with poor brazability, such as the outside of the hollow structure. However, because the method requires covering the material to be brazed with a preheated wind-shield jig in the furnace, the method requires setting a movable wind-shield jig in the brazing furnace to be industrially applicable, which complicates the structure and the configuration of the brazing furnace. This structure increases the cost of the furnace. In addition, the structure including the wind-shield jig requires a large volume in the furnace, and has a problem of increase in heating cost of the furnace.

Accordingly, an object of the present invention is to provide a brazing method for brazing a material to be brazed formed of an aluminum alloy in an inert gas atmosphere without using a flux, enabling reduction in time required for increasing the temperature of the material to be brazed by an inexpensive method, and achieving good brazability.

Solution to Problem

Specifically, the present invention (1) provides a brazing method for brazing a material to be brazed formed of an aluminum alloy in an inert gas atmosphere without using a flux, comprising: disposing a cover member (1), a heat transmission promoting member (1), and a material to be brazed in a brazing furnace, in a state in which the material to be brazed is covered with the cover member (1) formed of an upper cover portion covering whole upper portion of the material to be brazed and side cover portions covering at least some of side portions of the material to be brazed, with the upper cover portion contacting the upper portion of the material to be brazed, and the material to be brazed and the cover member are held with the heat transmission promoting member (1) formed of an upper heat transmission promoting portion covering whole or some of the upper cover portion of the cover member (1) and a lower heat transmission promoting portion covering whole or some of a lower portion of the material to be brazed, with the upper heat transmission promoting portion contacting the upper cover portion of the cover member (1), and with the lower heat transmission promoting portion contacting the lower portion of the material to be brazed, and thereafter subjecting the material to be brazed to brazing heating in the inert gas atmosphere to perform brazing of the material to be brazed.

The present invention (2) provides a brazing method for brazing a material to be brazed formed of an aluminum alloy in an inert gas atmosphere without using a flux, comprising: disposing a cover member (2), a heat transmission promoting member (2), and a material to be brazed in a brazing furnace, in a state in which the material to be brazed is covered with the cover member (2) formed of a lower cover portion covering whole lower portion of the material to be brazed and side cover portions covering at least some of side portions of the material to be brazed, with the lower cover portion contacting the lower portion of the material to be brazed, and the material to be brazed and the cover member are held with the heat transmission promoting member (2) formed of an lower heat transmission promoting portion covering whole or some of the lower cover portion of the cover member (2) and an upper heat transmission promoting portion covering whole or some of an upper portion of the material to be brazed, with the lower heat transmission promoting portion contacting the lower cover portion of the cover member (2), and with the upper heat transmission promoting portion contacting the upper portion of the material to be brazed, and thereafter subjecting the material to be brazed to brazing heating in the inert gas atmosphere to perform brazing of the material to be brazed.

The present invention (3) provides a brazing method for brazing a material to be brazed formed of an aluminum alloy in an inert gas atmosphere without using a flux, comprising: disposing a cover member (3), a heat transmission promoting member (3), and a material to be brazed in a brazing furnace, in a state in which the material to be brazed is covered with the cover member (3) covering at least some of side portions of the material to be brazed, and the material to be brazed is held with the heat transmission promoting member (3) formed of an upper heat transmission promoting portion covering whole or some of an upper portion of the material to be brazed and a lower heat transmission promoting portion covering whole or some of a lower portion of the material to be brazed, with the upper heat transmission promoting portion contacting the upper portion of the material to be brazed, and with the lower heat transmission promoting portion contacting the lower portion of the material to be brazed, and thereafter subjecting the material to be brazed to brazing heating in the inert gas atmosphere to perform brazing of the material to be brazed.

The present invention (4) provides a brazing method for brazing a material to be brazed formed of an aluminum alloy in an inert gas atmosphere without using a flux, comprising: disposing a cover member (4), a heat transmission promoting member (4), and a material to be brazed in a brazing furnace, in a state in which the material to be brazed is held with the heat transmission promoting member (4) formed of an upper heat transmission promoting portion covering some of an upper portion of the material to be brazed and a lower heat transmission promoting portion covering whole or some of a lower portion of the material to be brazed, with the upper heat transmission promoting portion contacting the upper portion of the material to be brazed, and with the lower heat transmission promoting portion contacting the lower portion of the material to be brazed, and the material to be brazed is covered with the cover member (4) formed of an upper cover portion covering a portion of the upper portion of the material to be brazed that is not covered with the upper heat transmission promoting portion and side cover portions covering at least some of side portions of the material to be brazed, and thereafter subjecting the material to be brazed to brazing heating in the inert gas atmosphere to perform brazing of the material to be brazed.

The present invention (5) provides the brazing method according to any one of (1) to (4), wherein a ratio (B/A) of a volume (B) inside setting positions of the heat transmission promoting member and the cover member to a volume (A) inside the material to be brazed is 1.0 to 5.0.

The present invention (6) provides the brazing method according to any one of (1) to (5), wherein a ratio (C/A) of a volume (C) of a portion located inside the material to be brazed and covered at side portions with the cover member to a volume (A) inside the material to be brazed is 0.8 or more.

The present invention (7) provides the brazing method according to (6), wherein a ratio (C1/A) of a volume (C1) of a portion located inside the material to be brazed and located upper than lower ends of side cover portions of the cover member to the volume (A) inside the material to be brazed is 0.8 or more.

The present invention (8) provides the brazing method according to (6), wherein a ratio (C2/A) of a volume (C2) of a portion located inside the material to be brazed and located lower than upper ends of side cover portions of the cover member to the volume (A) inside the material to be brazed is 0.8 or more.

The present invention (9) provides the brazing method according to (6), wherein a ratio (C3/A) of a volume (C3) of a portion located inside the material to be brazed and located lower than upper ends of the cover member to the volume (A) inside the material to be brazed is 0.8 or more.

The present invention (10) provides the brazing method according to (6), wherein a ratio (C4/A) of a volume (C4) of a portion located inside the material to be brazed and located upper than lower ends of side cover portions of the cover member to the volume (A) inside the material to be brazed is 0.8 or more.

The present invention (11) provides the brazing method according to any one of (1) to (10), wherein the cover member is formed of aluminum or an aluminum alloy, and the heat transmission promoting member is formed of stainless steel, iron, carbon, or ceramics.

The present invention (12) provides the brazing method according to (11), wherein the aluminum alloy forming the cover member contains Mg.

Effects of Invention

The present invention provides a brazing method for brazing a material to be brazed formed of an aluminum alloy in an inert gas atmosphere without using a flux, enabling reduction in time required for increasing a temperature of the material to be brazed with an inexpensive method, and achieving good brazability.

BRIEF DESCRIPTION OF DRAWINGS

FIG. 1 is a schematic plane view illustrating a mode example of an assembly of a material to be brazed, a cover member, and a heat transmission promoting member in a brazing method according to a first mode of the present invention.

FIG. 2 is a cross-sectional view taken along line X-X of FIG. 1.

FIG. 3 is a schematic plane view illustrating a mode example of an assembly of a material to be brazed, a cover member, and a heat transmission promoting member in a brazing method according to a second mode of the present invention.

FIG. 4 is a cross-sectional view taken along line X-X of FIG. 3.

FIG. 5 is a schematic plane view illustrating a mode example of an assembly of a material to be brazed, a cover member, and a heat transmission promoting member in a brazing method according to a third mode of the present invention.

FIG. 6 is a cross-sectional view taken along line X-X of FIG. 5.

FIG. 7 is a schematic plane view illustrating a mode example of an assembly of a material to be brazed, a cover member, and a heat transmission promoting member in a brazing method according to a fourth mode of the present invention.

FIG. 8 is a cross-sectional view taken along line X-X of FIG. 7.

FIG. 9 is a diagram for explaining volume (A) inside the material to be brazed.

FIG. 10 is a diagram for explaining volume (B) inside setting positions of the heat transmission promoting member and the cover member.

FIG. 11 is a diagram for explaining volume (B) inside the setting positions of the heat transmission promoting member and the cover member.

FIG. 12 is a diagram for explaining volume (C1) of a portion located inside the material to be brazed and located upper than the lower ends of side cover portions of the cover member.

FIG. 13 is a diagram for explaining volume (C2) of a portion located inside the material to be brazed and located lower than the upper ends of side cover portions of the cover member.

FIG. 14 is a diagram for explaining volume (C3) of a portion located inside the material to be brazed and located lower than the upper ends of side cover portions of the cover member.

FIG. 15 is a schematic cross-sectional view illustrating a mode example of an assembly of Examples 2 and 3.

EMBODIMENTS

A brazing method according to a first mode of the present invention is a brazing method for brazing a material to be brazed formed of an aluminum alloy in an inert gas atmosphere without using a flux, comprising: disposing a cover member (1), a heat transmission promoting member (1), and a material to be brazed in a brazing furnace, in a state in which the material to be brazed is covered with the cover member (1) formed of an upper cover portion covering whole upper portion of the material to be brazed and side cover portions covering at least some of side portions of the material to be brazed, with the upper cover portion contacting the upper portion of the material to be brazed, and the material to be brazed and the cover member are held with the heat transmission promoting member (1) formed of an upper heat transmission promoting portion covering whole or some of the upper cover portion of the cover member (1) and a lower heat transmission promoting portion covering whole or some of a lower portion of the material to be brazed, with the upper heat transmission promoting portion contacting the upper cover portion of the cover member (1), and with the lower heat transmission promoting portion contacting the lower portion of the material to be brazed, and thereafter subjecting the material to be brazed to brazing heating in the inert gas atmosphere to perform brazing of the material to be brazed.

A brazing method according to a second mode of the present invention is a brazing method for brazing a material to be brazed formed of an aluminum alloy in an inert gas atmosphere without using a flux, comprising: disposing a cover member (2), a heat transmission promoting member (2), and a material to be brazed in a brazing furnace, in a state in which the material to be brazed is covered with the cover member (2) formed of a lower cover portion covering whole lower portion of the material to be brazed and side cover portions covering at least some of side portions of the material to be brazed, with the lower cover portion contacting the lower portion of the material to be brazed, and the material to be brazed and the cover member are held with the heat transmission promoting member (2) formed of an lower heat transmission promoting portion covering whole or some of the lower cover portion of the cover member (2) and an upper heat transmission promoting portion covering whole or some of an upper portion of the material to be brazed, with the lower heat transmission promoting portion contacting the lower cover portion of the cover member (2), and with the upper heat transmission promoting portion contacting the upper portion of the material to be brazed, and thereafter subjecting the material to be brazed to brazing heating in the inert gas atmosphere to perform brazing of the material to be brazed.

A brazing method according to a third mode of the present invention is a brazing method for brazing a material to be brazed formed of an aluminum alloy in an inert gas atmosphere without using a flux, comprising: disposing a cover member (3), a heat transmission promoting member (3), and a material to be brazed in a brazing furnace, in a state in which the material to be brazed is covered with the cover member (3) covering at least some of side portions of the material to be brazed, and the material to be brazed is held with the heat transmission promoting member (3) formed of an upper heat transmission promoting portion covering whole or some of an upper portion of the material to be brazed and a lower heat transmission promoting portion covering whole or some of a lower portion of the material to be brazed, with the upper heat transmission promoting portion contacting the upper portion of the material to be brazed, and with the lower heat transmission promoting portion contacting the lower portion of the material to be brazed, and thereafter subjecting the material to be brazed to brazing heating in the inert gas atmosphere to perform brazing of the material to be brazed.

A brazing method according to a fourth mode of the present invention is a brazing method for brazing a material to be brazed formed of an aluminum alloy in an inert gas atmosphere without using a flux, comprising: disposing a cover member (4), a heat transmission promoting member (4), and a material to be brazed in a brazing furnace, in a state in which the material to be brazed is held with the heat transmission promoting member (4) formed of an upper heat transmission promoting portion covering some of an upper portion of the material to be brazed and a lower heat transmission promoting portion covering whole or some of a lower portion of the material to be brazed, with the upper heat transmission promoting portion contacting the upper portion of the material to be brazed, and with the lower heat transmission promoting portion contacting the lower portion of the material to be brazed, and the material to be brazed is covered with the cover member (4) formed of an upper cover portion covering a portion of the upper portion of the material to be brazed that is not covered with the upper heat transmission promoting portion and side cover portions covering at least some of side portions of the material to be brazed, and thereafter subjecting the material to be brazed to brazing heating in the inert gas atmosphere to perform brazing of the material to be brazed.

The brazing method according to the first mode of the present invention, the brazing method according to the second mode of the present invention, the brazing method according to the third mode of the present invention, and the brazing method according to the fourth mode of the present invention have some common points, although they are different in assembly of the material to be brazed, the cover member, and the heat transmission promoting member. For this reason, the following explanation illustrates the brazing method according to the first mode of the present invention, the brazing method according to the second mode of the present invention, the brazing method according to the third mode of the present invention, and the brazing method according to the fourth mode of the present invention as "the brazing method according to the present invention" as the general term, with respect to the common points.

The brazing method according to the present invention is a brazing method for brazing a material to be brazed formed of an aluminum alloy in an inert gas atmosphere without using a flux, comprising disposing a material to be brazed formed of an aluminum alloy and serving as a brazing target in a brazing furnace, thereafter replacing the air in the brazing furnace with inert gas, and brazing heating the material to be brazed in the inert gas atmosphere to braze the material to be brazed.

In the brazing method according to the present invention, to perform brazing without using a flux, the element to break the oxide film needs to be included in the material to be brazed. For this reason, the material to be brazed according to the brazing method of the present invention at least comprises a formed product of a brazing sheet including at least a core material and a brazing material, and the aluminum alloy forming the core material or cladded aluminum alloy contains an element to break the oxide film. Specifically, in the brazing method of the present invention, the material to be brazed is an assembly of formed products formed of aluminum or an aluminum alloy in which formed products formed of aluminum or an aluminum alloy before brazing and serving as components of a product to be manufactured by brazing are combined into a shape of a product obtained after brazing, and some of the material to be brazed is formed of a formed product of a brazing sheet containing an element to break the oxide film. Accordingly, the material to be brazed at least comprises a formed product of a brazing sheet formed of aluminum or an aluminum alloy and containing an element to break the oxide film as some of the constituent elements.

Examples of a form of a brazing sheet containing an element to break the oxide film include a two-layer clad material (brazing material—core material), a three-layer clad material (brazing material—core material—brazing material, brazing material—intermediate layer—core material, brazing material—core material—sacrificial anode material), a four-layer clad material (brazing material—intermediate layer—core material—brazing material, brazing material—intermediate layer—core material—sacrificial anode material), and a five-layer clad material (brazing material—intermediate layer—core material—intermediate layer—brazing material). The brazing sheet containing the element to break the oxide film contains the element to break the oxide film in one or two or more of the core material, the brazing material, and the intermediate layer of the two-layer clad material, the three-layer clad material, the four-layer clad material, or the five-layer clad material. The description in parentheses after the two-layer clad material, the three-layer clad material, the four-layer clad material, or the five-layer clad material indicates the stacking order of the clad material. For example, the description "brazing material-intermediate layer-core material-intermediate layer-brazing material" indicates that a brazing material, an intermediate layer, a core material, an intermediate layer, and a brazing material are stacked in this order.

Examples of elements included in the material to be brazed to break the oxide film are Ca, Be, Mg, Ba, and Li.

In the brazing sheet containing an element to break the oxide film, for example, a 1000 series, 3000 series, and 6000 series aluminum alloy is used for the core material, and, for example, a 4000 series aluminum alloy is used for the brazing material.

Industrially, an example of the brazing sheet containing an element to break the oxide film is preferably a brazing sheet formed of a core material and a brazing material cladded onto one side surface or both side surfaces of the core material, or a brazing material cladded onto one side surface or both side surfaces of the core material with an intermediate layer interposed therebetween, and the brazing material contains Be, Mg, or Li.

In addition, in the brazing sheet containing an element to break the oxide film, when the brazing material contains Be, Mg, Li, or Bi, the brazing material is preferably formed of an aluminum alloy containing Si of 4 to 13 mass % as an essential composition, and one or more selected from the group consisting of Be of 0.006 to 0.12 mass %, Mg of 0.05 to 3.0 mass %, Li of 0.004 to 0.1 mass %, and Bi of 0.004 to 0.2 mass %.

In the brazing sheet containing an element to break the oxide film, when the core material or the intermediate layer contains the element to break the oxide film, the element included in the core material or the intermediate layer to break the oxide film is diffused into the brazing material during brazing heating and reaches the surface of the material to break the oxide film. The element to break the oxide film strongly bonds with oxygen, and easily oxidized. For this reason, having the element to break the oxide film in the core material or the intermediate layer prevents the element to break the oxide film from directly contacting the atmosphere during storage of the material and/or brazing heating in low temperatures. This structure prevents oxidization of the element during storage of the material and/or brazing heating in low temperatures. In the brazing sheet containing an element to break the oxide film, when the core material or the intermediate layer contains the element to break the oxide film, the core material is preferably formed of an aluminum alloy obtained by adding Mg of 0.1 to 5 mass % to a 3000 series aluminum alloy or a 1000 series aluminum alloy, and the intermediate layer is preferably formed of an aluminum alloy obtained by adding Mg of 0.1 to 5 mass % to a 3000 series aluminum alloy or a 1000 series aluminum alloy.

The material to be brazed may comprise a formed product formed of aluminum or an aluminum alloy not containing the element to break the oxide film, in addition to the formed product of the brazing sheet containing the element to break the oxide film. Specifically, the material to be brazed may consist of a formed product of a brazing sheet containing the element to break the oxide film, or may be formed of a brazing sheet containing the element to break the oxide film and a formed product formed of aluminum or an aluminum alloy not containing the element to break the oxide film.

The cover member (1) according to the brazing method of the first mode of the present invention is formed of an upper cover portion covering the whole upper portion of the material to be brazed, and side cover portions covering at least some of side portions of the material to be brazed, that is, covering whole or some of side portions of the material to be brazed. The cover member (1) is a member for reducing inflow of inert gas from the outside into the inside of the cover member by covering the material to be brazed together with the heat transmission promoting member (1) during brazing heating. When the material to be brazed and the cover member (1) are viewed from above, the cover member (1) surrounds the circumference of the material to be brazed.

In the present invention, covering the whole side portions of the material to be brazed means that the side projection drawing of the material to be brazed entirely overlaps the side projection drawing of the cover member. In addition, covering some of the side portions of the material to be brazed means that some of the side projection drawing of the material to be brazed overlaps the side projecting drawing of the cover member, and the other part of the side projecting drawing of the material to be brazed does not overlap the side projection drawing of the cover member.

Stainless steel and aluminum alloy are some examples of the material of the cover member (1). The material of the cover member (1) is preferably an aluminum alloy containing Mg, such as a 5000 series aluminum alloy, in the point that oxygen in the inert gas inside the cover member (1) reacts with the Mg element in the cover member (1) and the oxygen concentration in the inert gas inside the cover member (1) is reduced.

The upper cover portion and the side cover portions of the cover member (1) are formed of a plate-like material. The whole shape of the cover member (1) is properly selected according to the shape of the material to be brazed. As the interval between the side cover portion of the cover member (1) and the side portion of the material to be brazed decreases, the material to be brazed is more easily heated by radiant heat from the side cover portions. The interval between the side cover portion of the cover member (1) and the side portion of the material to be brazed is preferably 20 mm or less. When the shape of the side portions of the material to be brazed is complicated, there are cases where it is difficult to reduce the interval between the material to be brazed and the side cover portion of the cover member (1) in all of the side portions of the material to be brazed. In such cases, only the interval between the side portion of the material to be brazed close to the brazed portion and the side cover portion of the cover member (1) may be reduced.

The heat transmission promoting member (1) according to the brazing method of the first mode of the present invention is formed of an upper heat transmission promoting portion (1) covering whole or some of the upper cover portion of the cover member (1), and a lower heat transmission promoting portion (1) covering whole or some of the lower portion of the material to be brazed. The heat transmission promoting member (1) is a member for reducing inflow of the inert gas from the outside into the inside of the cover member (1) by covering the material to be brazed together with the cover member (1) during brazing heating, and increasing the temperature increase speed of the material to be brazed to shorten the temperature increase time by being in contact with the high-temperature inert gas flowing in the brazing furnace to absorb heat from the inert gas, increase the temperature in a short time, transmit the absorbed heat via heat transmission to the contacting material to be brazed or the cover member contacting the material to be brazed.

In the upper cover portion of the cover member (1), an area of the portion covered with the upper heat transmission promoting portion (1) of the heat transmission promoting member (1) is preferably 50 to 100% of the whole area of the upper cover portion of the cover member (1), particularly preferably 70 to 100% thereof, more preferably 100% thereof, that is, the whole upper cover portion of the cover member (1) is more preferably covered with the upper heat transmission promoting portion (1).

To prevent annealing in the brazing temperature region, heat-resistant materials, such as stainless steel, iron, carbon, ceramics, and the like are the materials of the heat transmission promoting member (1). The heat transmission promoting member (1) is heated with the heater of the brazing furnace and/or radiant heat from the furnace wall heated to a high temperature, in addition to the absorption of heat from the inert gas. For this reason, the heat transmission promoting member (1) is preferably black because the radiant heat absorption efficiency increases.

The upper heat transmission promoting portion (1) is formed of: a plate-like material; a block-like material having a thickness larger than that of the plate-like material; or a plate-like or block-like material provided with penetrating portions, such as a material having a lattice structure, a material having a honey-comb structure, and a plate-like or block-like material provided with a plurality of perforate holes. In addition, the lower heat transmission promoting portion (1) is formed of: a plate-like material; a block-like material having a thickness larger than that of the plate-like material; or a plate-like or block-like material provided with penetrating portions, such as a material having a lattice structure, a material having a honey-comb structure, and a plate-like or block-like material provided with a plurality of perforate holes. The whole shape of the upper heat transmission promoting portion (1) and the lower heat transmission promoting portion (1) is properly selected according to the shape of the material to be brazed or the cover member (1).

The upper heat transmission promoting portion (1) may cover the whole upper cover portion of the cover member (1), or some of the upper cover portion. Specifically, within a degree with which the effect of the present invention is not prevented, the upper heat transmission promoting portion (1) may not cover some of the upper cover portion of the cover member (1). In addition, when the upper heat transmission promoting portion (1) is formed of a plate-like or block-like material provided with a penetrating portion, the upper heat transmission promoting portion (1) formed of a plate-like or block-like material provided with a penetrating portion covers some of the upper cover portion of the cover member (1). For example, even when a penetrating portion is formed in the upper heat transmission promoting portion (1) in a position in which the upper cover portion of the cover member (1) exists, the effect of the present invention is not prevented.

The lower heat transmission promoting portion (1) may cover the whole lower portion of the material to be brazed, or some of the lower portion. Specifically, within a degree with which the effect of the present invention is not prevented, the lower heat transmission promoting portion (1) may not cover some of the lower portion of the material to be brazed. In addition, when the lower heat transmission promoting portion (1) is formed of a plate-like or block-like material provided with a penetrating portion, the lower heat transmission promoting portion (1) formed of a plate-like or block-like material provided with a penetrating portion covers some of the lower portion of the material to be brazed. For example, even when a penetrating portion is formed in the lower heat transmission promoting portion (1) in a position in which the lower portion of the material to be brazed exists, the effect of the present invention is not prevented.

The heat transmission promoting member (1) may also serve as the jig to fix the material to be brazed in brazing heating. In addition to the upper heat transmission promoting portion (1) and the lower heat transmission promoting portion (1), the heat transmission promoting member (1) may comprise a fastening bolt to fasten the upper heat transmission promoting portion (1) and the lower heat transmission promoting portion (1), a holding jig to hold the upper heat transmission promoting portion (1) and the lower heat transmission promoting portion (1), and/or a fitting jig.

In the brazing method according to the first mode of the present invention, first, the material to be brazed, the cover member (1), and the heat transmission promoting member (1) are assembled in a state in which the upper cover portion is brought into contact with the upper portion of the material to be brazed to cover the material to be brazed with the cover member (1), the upper heat transmission promoting portion (1) is brought into contact with the upper cover portion of the cover member (1), and the lower heat transmission promoting portion (1) is brought into contact with the lower portion of the material to be brazed to hold the material to be brazed and the cover member (1) with the heat transmission promoting member (1), and the obtained assembly is disposed in the brazing furnace. Specifically, the material to be brazed, the cover member (1), and the heat transmission promoting member (1) are disposed in the brazing furnace, in the state in which the upper portion of the material to be brazed is covered with the upper cover portion of the cover member (1), the lower portion of the material to be brazed is covered with the lower heat transmission promoting portion (1), and at least some of the side portions of the brazed portion are covered with the side portions of the cover member (1), and in the state in which the material to be brazed and the cover member (1) are held between the upper heat transmission promoting portion (1) and the lower heat transmission promoting portion (1). In the brazing method according to the first mode of the present invention, in brazing heating, the upper heat transmission promoting portion (1) and the lower heat transmission promoting portion (1) are exposed to high-temperature inert gas, the upper heat transmission promoting portion (1) contacts the upper cover portion of the cover member (1), the upper cover portion of the cover member (1) contacts the upper portion of the material to be brazed, and the lower heat transmission promoting portion (1) contacts the lower portion of the material to be brazed. For this reason, heat moved from the high-temperature inert gas in the brazing furnace to the upper heat transmission promoting portion (1) and the lower heat transmission promoting portion (1) moves to the material to be brazed via thermal conduction. This structure increases the heating efficiency of the material to be brazed, increases the temperature increase speed of the material to be brazed, and shortens the temperature increase time of the material to be brazed.

Explained in the following with reference to FIG. 1 and FIG. 2 is the assembly state of the material to be brazed, the cover member, and the heat transmission promoting member when disposed in the brazing furnace in the brazing method according to the first mode of the present invention. FIG. 1 is a top view of a mode example of an assembly of the material to be brazed, the cover member (1), and the heat transmission promoting member (1) when disposed in the brazing furnace in the brazing method according to the first mode of the present invention. FIG. 2 is a cross-sectional view taken along line X-X of FIG. 1. FIG. 2 illustrates only end surfaces of the material to be brazed and the cover member (1), for the sake of convenience of explanation. As illustrated in FIG. 1 and FIG. 2, an assembly 10a is prepared by assembling a material to be brazed 1, a cover member 2a formed of an upper cover portion 21 and side cover portions 22, and a heat transmission promoting member 3a formed of an upper heat transmission promoting portion 31a and a lower heat transmission promoting portion 32a into a state in which an upper portion of the material to be brazed 1 is covered with the upper cover portion 21 of the cover member 2a and side portions of the material to be brazed 1 are covered with side cover portions 22 of the cover member 2a, and a state in which the material to be brazed 1 and the cover member 2a are held between the upper heat transmission promoting portion 31a and the lower heat transmission promoting portion 32a. The assembly 10a is fixed by fastening the upper heat transmission promoting portion 31a and the lower heat transmission promoting portion 32a with fastening bolts 5a.

The cover member (2) according to a brazing method of a second mode of the present invention is formed of a lower cover portion covering the whole lower portion of the material to be brazed and side cover portions covering at least some of the side portions of the material to be brazed, that is, covering whole or some of the side portions of the material to be brazed. The cover member (2) is a member for reducing inflow of inert gas from the outside into the inside of the cover member by covering the material to be brazed together with the heat transmission promoting member (2) during brazing heating. When the material to be brazed and the cover member (2) are viewed from above, the cover member (2) surrounds the circumference of the material to be brazed.

Stainless steel and aluminum alloy are some examples of the material of the cover member (2). The material of the cover member (2) is preferably an aluminum alloy containing Mg, such as a 5000 series aluminum alloy, in the point that oxygen in the inert gas inside the cover member (2) reacts with the Mg element in the cover member (2) and the oxygen concentration in the inert gas inside the cover member (2) is reduced.

The lower cover portion and the side cover portions of the cover member (2) are formed of a plate-like material. The whole shape of the cover member (2) is properly selected according to the shape of the material to be brazed. As the interval between the side cover portion of the cover member (2) and the side portion of the material to be brazed decreases, the material to be brazed is more easily heated by radiant heat from the side cover portions. The interval between the side cover portion of the cover member (2) and the side portion of the material to be brazed is preferably 20 mm or less. When the shape of the side portions of the material to be brazed is complicated, there are cases where it is difficult to reduce the interval between the material to be brazed and the side cover portion of the cover member (2) in all of the side portions of the material to be brazed. In such cases, only the interval between the side portion of the material to be brazed close to the brazed portion and the side cover portion of the cover member (2) may be reduced.

The heat transmission promoting member (2) according to the brazing method of the second mode of the present invention is formed of a lower heat transmission promoting portion (2) covering whole or some of the lower cover portion of the cover member (2), and an upper heat transmission promoting portion (2) covering whole or some of the upper portion of the material to be brazed. The heat transmission promoting member (2) is a member for reducing inflow of the inert gas from the outside into the inside of the cover member (2) by covering the material to be brazed together with the cover member (2) during brazing heating, and increasing the temperature increase speed of the material to be brazed to shorten the temperature increase time by being in contact with the high-temperature inert gas flowing in the brazing furnace to absorb heat from the inert gas, increase the temperature in a short time, transmit the absorbed heat via heat transmission to the contacting material to be brazed or the cover member contacting the material to be brazed.

To prevent annealing in the brazing temperature region, heat-resistant materials, such as stainless steel, iron, carbon, ceramics, and the like are the material of the heat transmission promoting member (2). The heat transmission promoting member (2) is heated with the heater of the brazing furnace and/or radiant heat from the furnace wall heated to a high temperature, in addition to the absorption of heat from the inert gas. For this reason, the heat transmission promoting member (2) is preferably black because the radiant heat absorption efficiency increases.

The upper heat transmission promoting portion (2) is formed of: a plate-like material; a block-like material having a thickness larger than that of the plate-like material; or a plate-like or block-like material provided with penetrating portions, such as a material having a lattice structure, a material having a honey-comb structure, and a plate-like or block-like material provided with a plurality of perforate holes. In addition, the lower heat transmission promoting portion (2) is formed of: a plate-like material; a block-like material having a thickness larger than that of the plate-like material; or a plate-like or block-like material provided with penetrating portions, such as a material having a lattice structure, a material having a honey-comb structure, and a plate-like or block-like material provided with a plurality of perforate holes. The whole shape of the upper heat transmission promoting portion (2) and the lower heat transmission promoting portion (2) is properly selected according to the shape of the material to be brazed or the cover member (2).

The upper heat transmission promoting portion (2) may cover the whole upper portion of the material to be brazed, or some of the upper portion thereof. Specifically, within a degree with which the effect of the present invention is not prevented, the upper heat transmission promoting portion (2) may not cover some of the upper portion of the material to be brazed. In addition, when the upper heat transmission promoting portion (2) is formed of a plate-like or block-like material provided with a penetrating portion, the upper heat transmission promoting portion (2) formed of a plate-like or block-like material provided with a penetrating portion covers some of the upper portion of the material to be brazed. For example, even when a penetrating portion is formed in the upper heat transmission promoting portion (2) in a position in which the upper portion of the material to be brazed exists, the effect of the present invention is not prevented.

The lower heat transmission promoting portion (2) may cover the whole lower cover portion of the cover member (2), or some of the lower cover portion. Specifically, within a degree with which the effect of the present invention is not prevented, the lower heat transmission promoting portion (2) may not cover some of the lower portion of the lower cover portion of the cover member (2). In addition, when the lower heat transmission promoting portion (2) is formed of a plate-like or block-like material provided with a penetrating portion, the lower heat transmission promoting portion (2) formed of a plate-like or block-like material provided with a penetrating portion covers some of the lower cover portion of the cover member (2). For example, even when a penetrating portion is formed in the lower heat transmission promoting portion (2) in a position in which the lower cover portion of the cover member (2) exists, the effect of the present invention is not prevented.

The heat transmission promoting member (2) may also serve as the jig to fix the material to be brazed in brazing heating. In addition to the upper heat transmission promoting portion (2) and the lower heat transmission promoting portion (2), the heat transmission promoting member (2) may comprise a fastening bolt to fasten the upper heat transmission promoting portion and the lower heat transmission promoting portion, a holding jig to hold the upper heat transmission promoting portion (2) and the lower heat transmission promoting portion (2), and/or a fitting jig.

In the brazing method according to the second mode of the present invention, first, the material to be brazed, the cover member (2), and the heat transmission promoting member (2) are assembled in a state in which the lower cover portion is brought into contact with the lower portion of the material to be brazed to cover the material to be brazed with the cover member (2), the lower heat transmission promoting portion (2) is brought into contact with the lower cover portion of the cover member (2), and the upper heat transmission promoting portion (2) is brought into contact with the upper portion of the material to be brazed to hold the material to be brazed and the cover member (2) with the heat transmission promoting member (2), and the obtained assembly is disposed in the brazing furnace. Specifically, the material to be brazed, the cover member (2), and the heat transmission promoting member (2) are disposed in the brazing furnace, in the state in which the upper portion of the material to be brazed is covered with the upper heat transmission promoting portion (2), the lower portion of the material to be brazed is covered with the lower cover portion of the cover member (2), and at least some of the side portions of the brazed portion are covered with the side portions of the cover member (2), and in the state in which the material to be brazed and the cover member (2) are held between the upper heat transmission promoting portion (2) and the lower heat transmission promoting portion (2). In the brazing method according to the second mode of the present invention, in brazing heating, the upper heat transmission promoting portion (2) and the lower heat transmission promoting portion (2) are exposed to high-temperature inert gas, the lower heat transmission promoting portion (2) contacts the lower cover portion of the cover member (2), the lower cover portion of the cover member (2) contacts the lower portion of the material to be brazed, and the upper heat transmission promoting portion (2) contacts the upper portion of the material to be brazed. For this reason, heat moved from the high-temperature inert gas in the brazing furnace to the upper heat transmission promoting portion (2) and the lower heat transmission promoting portion (2) moves to the material to be brazed via thermal conduction. This structure increases the heating efficiency of the material to be brazed, increases the temperature increase speed of the material to be brazed, and shortens the temperature increase time of the material to be brazed.

Explained in the following with reference to FIG. 3 and FIG. 4 is the assembly state of the material to be brazed, the cover member, and the heat transmission promoting member when disposed in the brazing furnace in the brazing method according to the second mode of the present invention. FIG. 3 is a top view of a mode example of an assembly of the material to be brazed, the cover member (2), and the heat transmission promoting member (2) when disposed in the brazing furnace in the brazing method according to the second mode of the present invention. FIG. 4 is a cross-sectional view taken along line X-X of FIG. 3. FIG. 4 illustrates only end surfaces of the material to be brazed and the cover member (2), for the sake of convenience of explanation. As illustrated in FIG. 3 and FIG. 4, an assembly 10b is prepared by assembling a material to be brazed 1, a cover member 2b formed of a lower cover portion 23 and side cover portions 24, and a heat transmission promoting member 3b formed of an upper heat transmission promoting portion 31b and a lower heat transmission promoting portion 32b into a state in which a lower portion of the material to be brazed 1 is covered with the lower cover portion 23 of the cover member 2b and side portions of the material to be brazed 1 are covered with side cover portions 24 of the cover member 2b, and a state in which the material to be brazed 1 and the cover member 2b are held between the upper heat transmission promoting portion 31b and the lower heat transmission promoting portion 32b. The assembly 10b is fixed by fastening the upper heat transmission promoting portion 31b and the lower heat transmission promoting portion 32b with fastening bolts 5b.

The cover member (3) according to a brazing method of a third mode of the present invention is a member covering at least some of side portions of the material to be brazed, that is, covering whole or some of the side portions of the material to be brazed. The cover member (3) is a member for reducing inflow of the inert gas from the outside into the inside of the cover member by covering the material to be brazed together with the heat transmission promoting member (3) during brazing heating. When the material to be brazed and the cover member (3) are viewed from above, the cover member (3) surrounds the circumference of the material to be brazed.

Stainless steel and aluminum alloy are some examples of the material of the cover member (3). The material of the cover member (3) is preferably an aluminum alloy containing Mg, such as a 5000 series aluminum alloy, in the point that oxygen in the inert gas inside the cover member (3) reacts with the Mg element in the cover member (3) and the oxygen concentration in the inert gas inside the cover member (3) is reduced.

The cover member (3) is formed of a plate-like material. The whole shape of the cover member (3) is properly selected according to the shape of the material to be brazed. As the interval between the cover member (3) and the side portion of the material to be brazed decreases, the material to be brazed is more easily heated by radiant heat from the cover member (3). The interval between the cover member (3) and the side portion of the material to be brazed is preferably 20 mm or less. When the shape of the side portions of the material to be brazed is complicated, there are cases where it is difficult to reduce the interval between the material to be brazed and the cover member (3) in all of the side portions of the material to be brazed. In such cases, only the interval between the side portion of the material to be brazed close to the brazed portion and the cover member (3) may be reduced.

The heat transmission promoting member (3) according to the brazing method of the third mode of the present invention is formed of an upper heat transmission promoting portion (3) covering whole or some of the upper portion of the material to be brazed, and a lower heat transmission promoting portion (3) covering whole or some of the lower portion of the material to be brazed. The heat transmission promoting member (3) is a member for reducing inflow of the inert gas from the outside into the inside of the cover member (3) by covering the material to be brazed together with the cover member (3) during brazing heating, and increasing the temperature increase speed of the material to be brazed to shorten the temperature increase time by being in contact with the high-temperature inert gas flowing in the brazing furnace to absorb heat from the inert gas, increase the temperature in a short time, transmit the absorbed heat via heat transmission to the contacting material to be brazed.

To prevent annealing in the brazing temperature region, heat-resistant materials, such as stainless steel, iron, carbon, ceramics, and the like are the material of the heat transmission promoting member (3). The heat transmission promoting member (3) is heated with the heater of the brazing furnace and/or radiant heat from the furnace wall heated to a high temperature, in addition to the absorption of heat from the inert gas. For this reason, the heat transmission promoting member (3) is preferably black because the radiant heat absorption efficiency increases.

The upper heat transmission promoting portion (3) is formed of: a plate-like material; a block-like material having a thickness larger than that of the plate-like material; or a plate-like or block-like material provided with penetrating portions, such as a material having a lattice structure, a material having a honey-comb structure, and a plate-like or block-like material provided with a plurality of perforate holes. In addition, the lower heat transmission promoting portion (3) is formed of: a plate-like material; a block-like material having a thickness larger than that of the plate-like material; or a plate-like or block-like material provided with penetrating portions, such as a material having a lattice structure, a material having a honey-comb structure, and a plate-like or block-like material provided with a plurality of perforate holes. The whole shape of the upper heat transmission promoting portion (3) and the lower heat transmission promoting portion (3) is properly selected according to the shape of the material to be brazed or the cover member (3).

The upper heat transmission promoting portion (3) may cover the whole upper portion of the material to be brazed, or some of the upper portion thereof. Specifically, within a degree with which the effect of the present invention is not prevented, the upper heat transmission promoting portion (3) may not cover some of the upper portion of the material to be brazed. In addition, when the upper heat transmission promoting portion (3) is formed of a plate-like or block-like material provided with a penetrating portion, the upper heat transmission promoting portion (3) formed of a plate-like or block-like material provided with a penetrating portion covers some of the upper portion of the material to be brazed. For example, even when a penetrating portion is formed in the upper heat transmission promoting portion (3) in a position in which the upper portion of the material to be brazed exists, the effect of the present invention is not prevented.

The lower heat transmission promoting portion (3) may cover the whole lower portion of the material to be brazed, or some of the lower portion thereof. Specifically, within a degree with which the effect of the present invention is not prevented, the lower heat transmission promoting portion (3) may not cover some of the lower portion of the material to be brazed. In addition, when the lower heat transmission promoting portion (3) is formed of a plate-like or block-like material provided with a penetrating portion, the lower heat transmission promoting portion (3) formed of a plate-like or block-like material provided with a penetrating portion covers some of the lower portion of the material to be brazed. For example, even when a penetrating portion is formed in the lower heat transmission promoting portion (3) in a position in which the lower portion of the material to be brazed exists, the effect of the present invention is not prevented.

The heat transmission promoting member (3) may also serve as the jig to fix the material to be brazed in brazing heating. In addition to the upper heat transmission promoting portion (3) and the lower heat transmission promoting portion (3), the heat transmission promoting member (3) may comprise a fastening bolt to fasten the upper heat transmission promoting portion (3) and the lower heat transmission promoting portion (3), a holding jig to hold the upper heat transmission promoting portion (3) and the lower heat transmission promoting portion (3), and/or a fitting jig.

In the brazing method according to the third mode of the present invention, first, the material to be brazed, the cover member (3), and the heat transmission promoting member (3) are assembled in a state in which the side portions of the material to be brazed are covered with the cover member (3), the upper heat transmission promoting portion (3) is brought into contact with the upper portion of the material to be brazed, and the lower heat transmission promoting portion (3) is brought into contact with the lower portion of the material to be brazed to hold the material to be brazed with the heat transmission promoting member (3), and the obtained assembly is disposed in the brazing furnace. Specifically, the material to be brazed, the cover member (3), and the heat transmission promoting member (3) are disposed in the brazing furnace, in the state in which the upper portion of the material to be brazed is covered with the upper heat transmission promoting portion (3) of the heat transmission promoting member (3), the lower portion of the material to be brazed is covered with the lower heat transmission promoting portion (3) of the heat transmission promoting member (3), and at least some of the side portions of the brazed portion are covered with the cover member (3), and in the state in which the material to be brazed is held between the upper heat transmission promoting portion (3) and the lower heat transmission promoting portion (3). In the brazing method according to the third mode of the present invention, in brazing heating, the upper heat transmission promoting portion (3) and the lower heat transmission promoting portion (3) are exposed to high-temperature inert gas, the upper heat transmission promoting portion (3) contacts the upper portion of the material to be brazed, and the lower heat transmission promoting portion (3) contacts the lower portion of the material to be brazed. For this reason, heat moved from the high-temperature inert gas in the brazing furnace to the upper heat transmission promoting portion (3) and the lower heat transmission promoting portion (3) moves to the material to be brazed via thermal conduction. This structure increases the heating efficiency of the material to be brazed, increases the temperature increase speed of the material to be brazed, and shortens the temperature increase time of the material to be brazed.

Explained in the following with reference to FIG. 5 and FIG. 6 is the assembly state of the material to be brazed, the cover member, and the heat transmission promoting member when disposed in the brazing furnace in the brazing method according to the third mode of the present invention. FIG. 5 is a top view of a mode example of an assembly of the material to be brazed, the cover member (3), and the heat transmission promoting member (3) when disposed in the brazing furnace in the brazing method according to the third mode of the present invention. FIG. 6 is a cross-sectional view taken along line X-X of FIG. 5. FIG. 6 illustrates only end surfaces of the material to be brazed and the cover member (3), for the sake of convenience of explanation. As illustrated in FIG. 5 and FIG. 6, an assembly 10c is prepared by assembling a material to be brazed 1, a cover member 2c, and a heat transmission promoting member 3c formed of an upper heat transmission promoting portion 31c and a lower heat transmission promoting portion 32c into a state in which side portions of the material to be brazed 1 is covered with the cover member 2c, and a state in which the material to be brazed 1 and the cover member 2c are held between the upper heat transmission promoting portion 31c and the lower heat transmission promoting portion 32c. The assembly 10c is fixed by fastening the upper heat transmission promoting portion 31c and the lower heat transmission promoting portion 32c with fastening bolts 5c.

The cover member (4) according to the brazing method of the fourth mode of the present invention is formed of an upper cover portion covering a portion of an upper portion of the material to be brazed that is not covered with the upper heat transmission promoting portion (4), and side cover portions covering at least some of side portions of the material to be brazed, that is, covering whole or some of side portions of the material to be brazed. The cover member (4)

is a member for reducing inflow of inert gas from the outside into the inside of the cover member by covering the material to be brazed together with the heat transmission promoting member (4) during brazing heating. When the material to be brazed and the cover member (4) are viewed from above, the cover member (4) and the heat transmission promoting member (4) surround the circumference of the material to be brazed.

Stainless steel and aluminum alloy are some examples of the material of the cover member (4). The material of the cover member (4) is preferably an aluminum alloy containing Mg, such as a 5000 series aluminum alloy, in the point that oxygen in the inert gas inside the cover member (4) reacts with the Mg element in the cover member (4) and the oxygen concentration in the inert gas inside the cover member (4) is reduced.

The upper cover portion and the side cover portions of the cover member (4) are formed of a plate-like material. The whole shape of the cover member (4) is properly selected according to the shape of the material to be brazed. As the interval between the side cover portion of the cover member (4) and the side portion of the material to be brazed decreases, the material to be brazed is more easily heated by radiant heat from the side cover portions. The interval between the side cover portion of the cover member (4) and the side portion of the material to be brazed is preferably 20 mm or less. When the shape of the side portions of the material to be brazed is complicated, there are cases where it is difficult to reduce the interval between the material to be brazed and the side cover portion of the cover member (4) in all of the side portions of the material to be brazed. In such cases, only the interval between the side portion of the material to be brazed close to the brazed portion and the side cover portion of the cover member (4) may be reduced.

The heat transmission promoting member (4) according to the brazing method of the fourth mode of the present invention is formed of an upper heat transmission promoting portion (4) covering some of the upper portion of the material to be brazed, and a lower heat transmission promoting portion (4) covering whole or some of the lower portion of the material to be brazed. The heat transmission promoting member (4) is a member for reducing inflow of the inert gas from the outside into the inside of the cover member (4) by covering the material to be brazed together with the cover member (4) during brazing heating, and increasing the temperature increase speed of the material to be brazed to shorten the temperature increase time by being in contact with the high-temperature inert gas flowing in the brazing furnace to absorb heat from the inert gas, increase the temperature in a short time, transmit the absorbed heat via heat transmission to the contacting material to be brazed.

To prevent annealing in the brazing temperature region, heat-resistant materials, such as stainless steel, iron, carbon, ceramics, and the like are the material of the heat transmission promoting member (4). The heat transmission promoting member (4) is heated with the heater of the brazing furnace and/or radiant heat from the furnace wall heated to a high temperature, in addition to the absorption of heat from the inert gas. For this reason, the heat transmission promoting member (4) is preferably black because the radiant heat absorption efficiency increases.

The upper heat transmission promoting portion (4) is formed of: a plate-like material; a block-like material having a thickness larger than that of the plate-like material; or a plate-like or block-like material provided with penetrating portions, such as a material having a lattice structure, a material having a honey-comb structure, and a plate-like or block-like material provided with a plurality of perforate holes. In addition, the lower heat transmission promoting portion (4) is formed of: a plate-like material; a block-like material having a thickness larger than that of the plate-like material; or a plate-like or block-like material provided with penetrating portions, such as a material having a lattice structure, a material having a honey-comb structure, and a plate-like or block-like material provided with a plurality of perforate holes. The whole shape of the upper heat transmission promoting portion (4) and the lower heat transmission promoting portion (4) is properly selected according to the shape of the material to be brazed or the cover member (4).

The upper heat transmission promoting portion (4) covers some of the upper portion of the material to be brazed.

The lower heat transmission promoting portion (4) may cover the whole lower portion of the material to be brazed, or some of the lower portion thereof. Specifically, within a degree with which the effect of the present invention is not prevented, the lower heat transmission promoting portion (4) may not cover some of the lower portion of the material to be brazed. In addition, when the lower heat transmission promoting portion (4) is formed of a plate-like or block-like material provided with a penetrating portion, the lower heat transmission promoting portion (4) formed of a plate-like or block-like material provided with a penetrating portion covers some of the lower portion of the material to be brazed. For example, even when a penetrating portion is formed in the lower heat transmission promoting portion (4) in a position in which the lower portion of the material to be brazed exists, the effect of the present invention is not prevented.

In the assembly of the material to be brazed, the cover member (4), and the heat transmission promoting member (4), a clearance may exist between the upper cover portion of the cover member (4) and the upper heat transmission promoting portion (4), within a degree with which the effect of the present invention is not prevented. For example, even when a clearance exists between the upper cover portion of the cover member (4) and the upper heat transmission promoting portion (4) in a position in which the upper portion of the material to be brazed exists, the effect of the present invention is not prevented.

The heat transmission promoting member (4) may also serve as the jig to fix the material to be brazed in brazing heating. In addition to the upper heat transmission promoting portion and the lower heat transmission promoting portion, the heat transmission promoting member (4) may comprise a fastening bolt to fasten the upper heat transmission promoting portion and the lower heat transmission promoting portion, a holding jig to hold the upper heat transmission promoting portion (1) and the lower heat transmission promoting portion (1), and/or a fitting jig.

In the brazing method according to the fourth mode of the present invention, first, the material to be brazed, the cover member (4), and the heat transmission promoting member (4) are assembled in a state in which the upper heat transmission promoting portion is brought into contact with the upper portion of the material to be brazed, and the lower heat transmission promoting portion is brought into contact with the lower portion of the material to be brazed to hold the material to be brazed with the heat transmission promoting member (4), and a portion of the material to be brazed that is not covered with the heat transmission promoting member (4) is covered with the cover member (4), and the obtained assembly is disposed in the brazing furnace. Specifically, the material to be brazed, the cover member (4), and the heat transmission promoting member (4) are disposed in the brazing furnace, in the state in which the upper portion of the material to be brazed is covered with the upper heat transmission promoting portion of the heat transmission promoting member (4) and the upper cover portion of the cover member (4), at least some of the side portions of the brazed portion are covered with the side portions of the cover member (4), and the lower portion of the material to be brazed is covered with the lower heat transmission promoting portion of the heat transmission promoting member (4), and in the state in which the material to be brazed is held between the upper heat transmission promoting portion and the lower heat transmission promoting portion. In the brazing method according to the fourth mode of the present invention, in brazing heating, the upper heat transmission promoting portion and the lower heat transmission promoting portion are exposed to high-temperature inert gas, the upper heat transmission promoting portion contacts the upper cover portion of the material to be brazed, and the lower heat transmission promoting portion contacts the lower portion of the material to be brazed. For this reason, heat moved from the high-temperature inert gas in the brazing furnace to the upper heat transmission promoting portion and the lower heat transmission promoting portion moves to the material to be brazed via thermal conduction. This structure increases the heating efficiency of the material to be brazed, increases the temperature increase speed of the material to be brazed, and shortens the temperature increase time of the material to be brazed.

Explained in the following with reference to FIG. 7 and FIG. 8 is an explanation of the assembly state of the material to be brazed, the cover member, and the heat transmission promoting member when disposed in the brazing furnace in the brazing method according to the fourth mode of the present invention. FIG. 7 is a top view of a mode example of an assembly of the material to be brazed, the cover member (4), and the heat transmission promoting member (4) when disposed in the brazing furnace in the brazing method according to the fourth mode of the present invention. FIG. 8 is a cross-sectional view taken along line X-X of FIG. 7. FIG. 8 illustrates only end surfaces of the material to be brazed and the cover member (4), for the sake of convenience of explanation. As illustrated in FIG. 7 and FIG. 8, an assembly 10d is prepared by assembling a material to be brazed 1, a cover member 2d formed of an upper cover portion 27 and side cover portions 28, and a heat transmission promoting member 3d formed of an upper heat transmission promoting portion 31d and a lower heat transmission promoting portion 32d into a state in which an upper portion of the material to be brazed 1 is covered with the upper heat transmission promoting portion 31d and the upper cover portion 27 of the cover member 2d and side portions of the material to be brazed 1 are covered with side cover portions 28 of the cover member 2d, and a state in which the material to be brazed 1 is held between the upper heat transmission promoting portion 31d and the lower heat transmission promoting portion 32d. The assembly 10d is fixed by holding the upper heat transmission promoting portion 31d of the heat transmission promoting member 3d holding the material to be brazed 1 from above and below with an upper holding jig 41d from above, holding the lower heat transmission promoting portion 32d with a lower holding jig 42d from below, and fastening the structure with fastening bolts 5d.

In the brazing method according to the present invention, thereafter, the material to be brazed is subjected to brazing heating in the inert gas atmosphere to perform brazing of the material to be brazed. Specifically, in a state in which the material to be brazed, the cover member, and the heat transmission promoting member are settled in the brazing furnace, the air in the brazing furnace is replaced with the inert gas to change the atmosphere in the brazing furnace to the inert gas atmosphere. Thereafter, the temperature in the brazing furnace is increased, and the material to be brazed is subjected to brazing heating in the inert gas atmosphere to perform brazing of the material to be brazed and obtain the brazed material.

The brazing method according to the present invention is a brazing method without using a flux. In a brazing method without using a flux, it is required to avoid oxidization of the aluminum material during brazing heating. For this reason, in the brazing method according to the present invention, the material to be brazed is brazed in an inert gas atmosphere. Nitrogen gas, argon gas, and helium gas are examples of the inert gas. Because oxygen in the inert gas serves as a cause of decrease in brazability, brazability increases as the oxygen concentration in the inert gas decreases. The oxygen concentration in the inert gas is preferably 100 ppm or less. In addition, because the moisture in the inert gas also serves as a cause of decrease in brazability in a high-temperature state, brazability increases as the moisture content in the inert gas decreases. The dew point of the inert gas is preferably −30° C. or less.

The temperature increase speed in brazing heating has an influence on brazability. When the temperature increase speed is low, the surface of the aluminum material broken once is easily re-oxidized, and brazability decreases. For this reason, the temperature is preferably increased from 300° C. to 600° C., at which oxidization easily progresses, within 40 minutes. The temperature increase speed in a temperature region from 300° C. to 600° C. in brazing heating is preferably 10 to 40° C./min, particularly preferably 15 to 40° C./min. The maximum temperature in brazing heating is a temperature equal to or higher than the melting point of the brazing material, preferably 600 to 610° C.

In the brazing method according to the present invention, the ratio (B/A) of the volume (B) inside the setting positions of the heat transmission promoting member and the cover member to the volume (A) inside the material to be brazed is preferably 1.0 to 5.0, particularly preferably 1.0 to 3.0. The ratio of the volume (B) to the volume (A) falling within the range described above reduces the capacity of the space between the material to be brazed and the side cover portion of the cover member. This structure increases the heating efficiency of the material to be brazed in brazing heating, and increases the temperature increase speed of the material to be brazed in brazing heating.

The term "volume (A) inside the material to be brazed" indicates the volume of the portion surrounded by the internal wall of the material to be brazed and an extended plane of the internal wall. In the mode example illustrated in FIG. 9, the volume (A) indicates the volume of a portion 6 surrounded by the internal wall 11 of the material to be brazed 1 and extended lines 12 (illustrated with broken lines in FIG. 9) of the internal wall.

In addition, (i) in the brazing method according to the first mode of the present invention, the term "volume (B) inside the setting positions of the heat transmission promoting member and the cover member" indicates a volume of a portion surrounded by the internal wall (the internal wall of the cover member (1) and the extended plane of the internal wall, when the lower ends of the side cover portions of the cover member (1) are not in contact with the upper surface of the lower heat transmission promoting portion (1)) of the cover member (1) and the upper surface (the upper surface of the lower heat transmission promoting portion (1) and an extended plane of the upper surface, when a penetrating portion is formed in the lower heat transmission promoting portion (1)) of the lower heat transmission promoting portion (1). In the mode example illustrated in FIG. 10, the volume (B) indicates a volume of a portion 71 surrounded by an internal wall 221a of the cover member 2a and an upper surface 321a of the lower heat transmission promoting portion 32a. In the mode example illustrated in FIG. 11, the volume (A) indicates a volume of a portion 72 surrounded by an internal wall 221a1 of the cover member 2a1, an extended plane 222a1 of the internal wall, and an upper surface 321a1 of the lower heat transmission promoting portion 32a1.

In addition, (ii) in the brazing method according to the second mode of the present invention, the term "volume (B) inside the setting positions of the heat transmission promoting member and the cover member" indicates a volume of a portion surrounded by the internal wall (the internal wall of the cover member (2) and the extended plane of the internal wall, when the lower ends of the side cover portions of the cover member (2) are not in contact with the lower surface of the upper heat transmission promoting portion (2)) of the cover member (2) and the lower surface (the lower surface of the upper heat transmission promoting portion (2) and an extended plane of the lower surface, when a penetrating portion is formed in the upper heat transmission promoting portion (2)) of the upper heat transmission promoting portion (2).

In addition, (iii) in the brazing method according to the third mode of the present invention, the term "volume (B) inside the setting positions of the heat transmission promoting member and the cover member" indicates a volume of a portion surrounded by the internal wall (the internal wall of the cover member (3) and the extended plane of the internal wall, when the upper ends of the cover member (3) are not in contact with the lower surface of the upper heat transmission promoting portion (3)) of the cover member (3), the lower surface (the lower surface of the upper heat transmission promoting portion (3) and an extended plane of the lower surface, when a penetrating portion is formed in the upper heat transmission promoting portion (3)) of the upper heat transmission promoting portion (3), and the upper surface (the upper surface of the lower heat transmission promoting portion (3) and an extended plane of the upper surface, when a penetrating portion is formed in the lower heat transmission promoting portion (3)) of the lower heat transmission promoting portion (3).

In addition, (iv) in the brazing method according to the fourth mode of the present invention, the term "volume (B) inside the setting positions of the heat transmission promoting member and the cover member" indicates a volume of a portion surrounded by the internal wall (the internal wall of the cover member (4) and the extended plane of the internal wall, when the lower ends of the side cover portions of the cover member (4) are not in contact with the lower surface of the lower heat transmission promoting portion (4) or the internal side ends of the upper cover portion of the cover member (4) are not in contact with the external side surfaces of the upper heat transmission promoting portion (4)) of the cover member (4), the lower surface (the lower surface of the upper heat transmission promoting portion (4) and an extended plane of the lower surface, when a penetrating portion is formed in the upper heat transmission promoting portion (4)) of the upper heat transmission promoting portion (4), and the upper surface (the upper surface of the lower heat transmission promoting portion (4) and an extended plane of the upper surface, when a penetrating portion is formed in the lower heat transmission promoting portion (4)) of the lower heat transmission promoting portion (4).

The ratio (C/A) of the volume (C) of a portion located inside the material to be brazed and covered at side portions with the cover member to the volume (A) inside the material to be brazed is preferably 0.6 or more, particularly preferably 0.8 or more, more preferably 0.9 or more. The ratio of the volume (C) to the volume (A) falling within the range described above suppresses inflow of the inert gas from the outside into the inside of the cover member to low quantity. This structure increases the effect of preventing re-oxidization of the surface of the aluminum material due to oxygen in the inert gas in brazing heating, and increases the brazability. The term "volume (C) of a portion located inside the material to be brazed and covered at side portions with the cover member" indicates a volume of a portion located inside the material to be brazed and overlapping, at side surfaces, the cover member, when the assembly of the material to be brazed, the cover member, and the heat transmission promoting member is viewed in side view. In other words, the volume indicates a volume of a portion located inside the material to be brazed and invisible through a clearance between the cover member and the heat transmission promoting member because it is hidden with the cover member, when the assembly of the material to be brazed, the cover member, and the heat transmission promoting member is viewed in side view.

In the brazing method according to the first mode of the present invention, the "ratio (C/A) of the volume (C) of a portion located inside the material to be brazed and covered at side portions with the cover member to the volume (A) inside the material to be brazed" corresponds to "ratio (C1/A) of a volume (C1) of a portion located inside the material to be brazed and located upper than the lower ends of the side cover portions of the cover member to the volume (A) inside the material to be brazed". In the brazing method according to the first mode of the present invention, the ratio (C1/A) of a volume (C1) of a portion located inside the material to be brazed and located upper than the lower ends of the side cover portions of the cover member to the volume (A) inside the material to be brazed is preferably 0.8 or more, particularly preferably 0.9 or more. The ratio of the volume (C1) to the volume (A) falling within the range described above suppresses inflow of the inert gas from the outside into the inside of the cover member to low quantity. This structure increases the effect of preventing re-oxidization of the surface of the aluminum material due to oxygen in the inert gas in brazing heating, and increases the brazability. The "volume (C1) of a portion located inside the material to be brazed and located upper than the lower ends of the side cover portions of the cover member" indicates a volume of a portion located upper than the lower ends of the side cover portions of the cover member (1), as viewed in the vertical direction, in the portion surrounded by the internal wall of the material to be brazed and the extended plane of the internal wall. In the mode example illustrated in FIG. 12, the "volume (C1) of a portion located inside the material to be brazed and located upper than the lower ends of the side cover portions of the cover member" indicates a volume of a portion 81 located upper than the vertical position (position illustrated with a broken line in FIG. 12) of the lower ends 13d of the side cover portions of the cover member 2d, in the portion surrounded by the internal wall of the material to be brazed and the extended plane of the internal wall.

In the brazing method according to the second mode of the present invention, the "ratio (C/A) of the volume (C) of a portion located inside the material to be brazed and covered at side portions with the cover member to the volume (A) inside the material to be brazed" corresponds to "ratio (C2/A) of a volume (C2) of a portion located inside the material to be brazed and located lower than the upper ends of the side cover portions of the cover member to the volume (A) inside the material to be brazed". In the brazing method according to the second mode of the present invention, the ratio (C2/A) of a volume (C2) of a portion located inside the material to be brazed and located lower than the upper ends of the side cover portions of the cover member to the volume (A) inside the material to be brazed is preferably 0.8 or more, particularly preferably 0.9 or more. The ratio of the volume (C2) to the volume (A) falling within the range described above suppresses inflow of the inert gas from the outside into the inside of the cover member to low quantity. This structure increases the effect of preventing re-oxidization of the surface of the aluminum material due to oxygen in the inert gas in brazing heating, and increases the brazability. The "volume (C2) of a portion located inside the material to be brazed and located lower than the upper ends of the side cover portions of the cover member" indicates a volume of a portion located lower than the upper ends of the side cover portions of the cover member (2), as viewed in the vertical direction, in the portion surrounded by the internal wall of the material to be brazed and the extended plane of the internal wall. In the mode example illustrated in FIG. 13, the "volume (C2) of a portion located inside the material to be brazed and located lower than the upper ends of the side cover portions of the cover member" indicates a volume of a portion 82 located lower than the vertical position (position illustrated with a broken line in FIG. 13) of the upper ends 13e of the side cover portions of the cover member 2e, in the portion surrounded by the internal wall of the material to be brazed and the extended plane of the internal wall.

In the brazing method according to the third mode of the present invention, the "ratio (C/A) of the volume (C) of a portion located inside the material to be brazed and covered at side portions with the cover member to the volume (A) inside the material to be brazed" corresponds to "ratio (C3/A) of a volume (C3) of a portion located inside the material to be brazed and located lower than the upper ends of the cover member to the volume (A) inside the material to be brazed". In the brazing method according to the third mode of the present invention, the ratio (C3/A) of a volume (C3) of a portion located inside the material to be brazed and located lower than the upper ends of the cover member to the volume (A) inside the material to be brazed is preferably 0.8 or more, particularly preferably 0.9 or more. The ratio of the volume (C3) to the volume (A) falling within the range described above suppresses inflow of the inert gas from the outside into the inside of the cover member to low quantity. This structure increases the effect of preventing re-oxidization of the surface of the aluminum material due to oxygen in the inert gas in brazing heating, and increases the brazability. The "volume (C3) of a portion located inside the material to be brazed and located lower than the upper ends of the cover member" indicates a volume of a portion located lower than the upper ends of the cover member (3), as viewed in the vertical direction, in the portion surrounded by the internal wall of the material to be brazed and the extended plane of the internal wall. In the mode example illustrated in FIG. 14, the "volume (C3) of a portion located inside the material to be brazed and located lower than the upper ends of the cover member" indicates a volume of a portion 83 located lower than the vertical position (position illustrated with a broken line in FIG. 14) of the upper ends 13f of the cover member 2f, in the portion surrounded by the internal wall of the material to be brazed and the extended plane of the internal wall.

In the brazing method according to the fourth mode of the present invention, the "ratio (C/A) of the volume (C) of a portion located inside the material to be brazed and covered at side portions with the cover member to the volume (A) inside the material to be brazed" corresponds to "ratio (C4/A) of a volume (C4) of a portion located inside the material to be brazed and located upper than the lower ends of the side cover portions of the cover member to the volume (A) inside the material to be brazed". In the brazing method according to the fourth mode of the present invention, the ratio (C4/A) of a volume (C4) of a portion located inside the material to be brazed and located upper than the lower ends of the side cover portions of the cover member to the volume (A) inside the material to be brazed is preferably 0.8 or more, particularly preferably 0.9 or more. The ratio of the volume (C4) to the volume (A) falling within the range described above suppresses inflow of the inert gas from the outside into the inside of the cover member to low quantity. This structure increases the effect of preventing re-oxidization of the surface of the aluminum material due to oxygen in the inert gas in brazing heating, and increases the brazability. The "volume (C4) of a portion located inside the material to be brazed and located upper than the lower ends of the side cover portions of the cover member" indicates a volume of a portion located upper than the lower ends of the side cover portions of the cover member (4), as viewed in the vertical direction, in the portion surrounded by the internal wall of the material to be brazed and the extended plane of the internal wall.

When the material to be brazed formed of an aluminum alloy is brazed in an inert gas atmosphere without using a flux, because an oxide film exists on the surface of the aluminum material, the oxide film is broken with the element included in the material forming the material to be brazed to break the oxide film, before the brazing material is molten in the temperature increase process during brazing heating, and brazing is performed. However, even when the oxide film is once broken and an aluminum metal surface is exposed, no good brazability is obtained when an oxide film is formed again. For this reason, when oxygen exists in the brazing atmosphere, brazability decreases. Even when the brazing atmosphere is an inert gas atmosphere, such as nitrogen and argon, inert gas such as nitrogen and argon includes a minute quantity of oxygen. Because re-oxidization occurs due to oxygen existing in a minute quantity in the inert gas atmosphere, a minute quantity of oxygen in the inert gas has a large influence on brazability. Generally, because brazing is industrially performed while the inert gas is circulated in the brazing furnace, the material to be brazed continuously contacts new inert gas, and oxygen in the inert gas is continuously supplied to the material to be brazed. For this reason, in the brazing method according to the present invention, the material to be brazed is covered with the cover member and the heat transmission promoting member. This structure reduces the quantity of inflow of the inert gas comprising oxygen in the brazing furnace to the periphery of the material to be brazed. This structure reduces the quantity of new inert gas outside the cover member and the heat transmission promoting member (that is, inert gas having higher oxygen concentration than the oxygen concentration inside the cover member and the heat transmission promoting member) flowing into the periphery of the material to be brazed, after the oxygen concentration in the inert gas around the material to be brazed decreases by union of the oxygen in the inert gas around the material to be brazed covered with the cover member and the heat transmission promoting member with the element included in the aluminum material forming the material to be brazed to break the oxide film. For this reason, in the brazing method according to the present invention, the periphery of the material to be brazed is covered with inert gas having very low oxygen concentration. With this structure, the brazing method according to the present invention prevents re-formation of an oxide film due to oxygen included in the inert gas, after the oxide film is broken with the element included in the material forming the material to be brazed to break the oxide film and an aluminum metal surface is exposed, in the temperature increase process during brazing heating. This structure secures stable brazability.

In this state, even when the oxygen concentration in the inert gas around the material to be brazed is reduced by covering the periphery of the material to be brazed, it is impossible to entirely prevent inflow of the inert gas into the inside of the cover. For this reason, when the temperature increase time of the material to be brazed increases in brazing heating, oxidization of the surface of the aluminum material occurs. For this reason, reduction in temperature increase time of the material to be brazed is required to acquire good brazability. However, when the periphery of the material to be brazed is covered with a cover, heating is performed by radiant heating from the heated cover, heat from the high-temperature inert gas is not sufficiently obtained, and the temperature of the material to be brazed cannot be increased in a short time. For this reason, in the brazing method according to the present invention, the heat transmission promoting member increasing in temperature in a short time by contacting the high-temperature inert gas flowing in the brazing furnace is provided to contact the material to be brazed or the cover member contacting the material to be brazed from outside. This structure enables efficient heating of the material to be brazed by heat transmission, increases the temperature increase speed of the material to be brazed, and shortens the temperature increase time of the material to be brazed. With this structure, the brazing method according to the present invention prevents re-formation of an oxide film due to oxygen included in the inert gas, after the oxide film is broken with the element included in the material forming the material to be brazed to break the oxide film and an aluminum metal surface is exposed, in the temperature increase process during brazing heating. This structure secures stable brazability.

In the brazing method according to the present invention, the material to be brazed, the cover member, and the heat transmission promoting member are assembled in advance before putting into the brazing furnace, and thereafter put into the brazing furnace. This structure achieves good brazability. For this reason, no special facility is required, as long as the furnace is capable of performing heating in an inert gas atmosphere. Accordingly, good brazing is enabled by applying an inert gas atmosphere furnace conventionally used for brazing of aluminum materials to the brazing method according to the present invention. For this reason, the brazing method according to the present invention enables easy and inexpensive industrial brazing.

The present invention will be described hereinafter with reference to examples, but the present invention is not limited to the following examples.

EXAMPLES

Example 1

As an aluminum material, a brazing material was cladded onto one side surface of a core material by hot rolling, the structure was rolled to a thickness of 0.5 mm by cold rolling and annealed to prepare a brazing sheet having one side surface cladded with the brazing material. The core material alloy of the brazing sheet was an aluminum alloy comprising Mn of 1.2 mass %, Si of 0.6 mass %, Cu of 0.15 mass %, and Mg of 0.5 mass % with the balance being Al. The brazing material alloy was an aluminum alloy comprising Si of 10 mass % with the balance being Al.

Thereafter, the obtained brazing sheet was subjected to press-forming (diameter of 40 mm) into a form of the material to be brazed illustrated in FIG. 1 and FIG. 2, with the brazing material serving as a concave surface, and two of the press-formed brazing sheets were combined into a material to be brazed.

In addition, a plate material of JIS A3003 having a thickness of 0.5 mm was subjected to press-forming to prepare the cover member (diameter of the upper cover portion: 50 mm, the height of the side cover portions: 16 mm) illustrated in FIG. 1. Two sheets of stainless steel plates having a thickness of 2 mm were prepared and provided with holes for fixing screws in four corners to prepare the heat transmission promoting member (upper heat transmission promoting portion and lower heat transmission promoting portion).

Thereafter, as illustrated in FIG. 1, in the state in which the material to be brazed was covered with the cover member from above, the structure was held with the heat transmission promoting member from above and below, and fixed with fixing screws to obtain an assembly of the material to be brazed, the cover member, and the heat transmission promoting member. In this state, the upper cover portion of the cover member contacted the upper portion of the material to be brazed, the upper heat transmission promoting portion of the heat transmission promoting member contacted the upper cover member, and the lower heat transmission promoting portion of the heat transmission promoting member contacted the lower portion of the material to be brazed.

The assembly of the material to be brazed, the cover member, and the heat transmission promoting member was set in a brazing furnace of nitrogen gas atmosphere, and left for 10 minutes at a temperature of 100° C. or less, and thereafter the brazing furnace was heated to 600° C. to perform brazing. As a result, the time required for increasing the material to be brazed to 600° C. was 20 minutes.

In addition, the brazed material after brazing was cut into halves, and the fillet formation states inside and outside of the brazed material were observed. As a result, good fillets were formed both in inside and outside of the brazed material.

Comparative Example 1

The same processing was performed as Example 1, except that the cover member of Example 1 was not used. Specifically, in Comparative Example 1, the material to be brazed was held with the heat transmission promoting member from above and below, and the structure was fixed with fixing screws to obtain an assembly of the material to be brazed and the heat transmission promoting member. In this state, the upper heat transmission promoting portion of the heat transmission promoting member contacted the upper portion of the material to be brazed, and the lower heat transmission promoting portion of the heat transmission promoting member contacted the lower portion of the material to be brazed.

As a result, the time required for increasing the material to be brazed to 600° C. was 20 minutes.

In addition, the brazed material after brazing was cut into halves, and the fillet formation states inside and outside of the brazed material were observed. Although a good fillet was formed inside, the fillet outside was discontinuous, and good brazability was not obtained.

Comparative Example 2

In the same manner as Comparative Example 1, an assembly of the material to be brazed and the heat transmission promoting member was prepared. Thereafter, a box-shaped cover (obtained by processing a plate material of JIS A3003 having a thickness of 0.5 mm into a size of 150 mm×150 mm×50 mm (height)) capable of covering the whole assembly of the material to be brazed and the heat transmission promoting member by placing the cover thereon from above was prepared. The box-shaped cover was placed on the assembly of the material to be brazed and the heat transmission promoting member to cover the whole assembly. Thereafter, the structure was heated in the same manner as Example 1 to perform brazing.

As a result, the time required for increasing the material to be brazed to 600° C. was 60 minutes.

In addition, the brazed material after brazing was cut into halves, and the fillet formation states inside and outside of the brazed material were observed. Although a good fillet was formed inside, the fillet outside was discontinuous, and good brazability was not obtained.

Examples 2 and 3

As an aluminum material, a brazing material was cladded onto one side surface of a core material by hot rolling, the structure was rolled to a thickness of 0.4 mm by cold rolling and annealed to prepare a brazing sheet having one side surface cladded with the brazing material. The core material alloy of the brazing sheet was an aluminum alloy comprising Mn of 1.2 mass %, Si of 0.6 mass %, Cu of 0.5 mass %, and Mg of 0.5 mass % with the balance being Al. The brazing material alloy was an aluminum alloy comprising Si of 10.0 mass % with the balance being Al.

Thereafter, the obtained brazing sheet was subjected to press-forming into a form of a material to be brazed 1a illustrated in FIG. 15, with the brazing material serving as a concave surface. The internal size of the material to be brazed was 55.5×18.0×10.0 mm.

In addition, a plate material of JIS A3003 having a thickness of 0.5 mm was subjected to press-forming to prepare a cover member 2g illustrated in FIG. 15. The internal size of the cover member was 72.0×32.0×10.0 mm (Example 2), and 100.0×40.0×10.0 mm (Example 3). In addition, a plate material of JIS A3003 (thickness of 0.5 mm) was cut to prepare a bottom plate member 1b. The bottom plate member 1b was a member to be brazed with the material to be brazed 1a, member serving as some of the material to be brazed 1a, and member covering the lower portion of the material to be brazed 1a. The size of the bottom plate member 1b was 80.0×40.0 mm×0.5 mm (Example 2), and 108.0×48.0 mm×0.5 mm (Example 3). Two sheets of stainless steel plates having a thickness of 2 mm were prepared and provided with holes for fixing screws in four corners to prepare the heat transmission promoting member (upper heat transmission promoting portion and lower heat transmission promoting portion).

Thereafter, as illustrated in FIG. 15, in the state in which the cover member is placed on the material to be brazed from above, the structure was held with the heat transmission promoting member from above and below, and fixed with fixing screws to obtain an assembly of the material to be brazed, the cover member, and the heat transmission promoting member. In this state, the upper cover portion of the cover member contacted the upper portion of the material to be brazed, the upper heat transmission promoting portion of the heat transmission promoting member contacted the upper cover member, and the lower heat transmission promoting portion of the heat transmission promoting member contacted the lower portion of the bottom plate member. A clearance was observed between the cover member and the bottom plate member after the assembly.

The assembly of the material to be brazed, the cover member, and the heat transmission promoting member was set in a brazing furnace of nitrogen gas atmosphere, and left for 10 minutes at a temperature of 100° C. or less, and thereafter the brazing furnace was heated to 600° C. to perform brazing.

In addition, the brazed material after brazing was cut into halves, and the fillet formation states inside and outside of the brazed material were observed. As a result, good fillets were formed both in inside and outside of the brazed material.

TABLE 1

|  | Example 2 | Example 3 |
|---|---|---|
| Material to be brazed |  |  |
| Internal Size (mm) | 55.5 × 18.0 × 10.0 | 55.5 × 18.0 × 10.0 |
| Volume (A) (cm³) | 10.0 | 10.0 |
| Cover Member |  |  |
| Internal Size (mm) | 72.0 × 32.0 × 10.0 | 100.0 × 40.0 × 10.0 |
| Volume (B) (cm³) | 24.0 | 40.0 |
| Volume Ratio (B/A) | 2.4 | 4.0 |
| Temperature Increase Time from 300° C. to 600° C. | 15 | 22 |
| Fillet Formation Evaluation |  |  |
| Inside | ○ | ○ |
| Outside | ○ | ○ |

In Examples 2 and 3, after assembly, good brazability was exhibited although a clearance existed between the cover member and the bottom plate member. From this result, it is inferred that the effect of the present invention is produced even when a clearance exists between the cover member and the bottom plate member, as long as the clearance is not too large. It is also inferred that some of the material to be brazed located outside the brazed portion may be disposed outside the cover member, within a degree not having an influence on the effect of the present invention.

The invention claimed is:

1. A brazing method for brazing a material to be brazed formed of an aluminum alloy in an inert gas atmosphere without using a flux, comprising:
disposing a cover member, a heat transmission promoting member, and the material to be brazed in a brazing furnace, in a state in which the material to be brazed is covered with the cover member formed of an upper cover portion covering a whole upper portion of the material to be brazed and side cover portions covering at least some of side portions of the material to be brazed, with the upper cover portion contacting the upper portion of the material to be brazed, the material to be brazed and the cover member are held with the heat transmission promoting member formed of an upper heat transmission promoting portion covering whole or some of the upper cover portion of the cover member and a lower heat transmission promoting portion covering whole or some of a lower portion of the material to be brazed, with the upper heat transmission promoting portion contacting the upper cover portion of the cover member, and with the lower heat transmission promoting portion contacting the lower portion of the material to be brazed, and thereafter subjecting the material to be brazed to heat in the inert gas atmosphere to perform the brazing of the material to be brazed.

2. The brazing method according to claim 1, wherein a ratio (B/A) of a volume (B) inside setting positions of the heat transmission promoting member and the cover member to a volume (A) inside the material to be brazed is 1.0 to 5.0.

3. The brazing method according to claim 1, wherein a ratio (C/A) of a volume (C) of a portion located inside the material to be brazed and covered at side portions with the cover member to a volume (A) inside the material to be brazed is 0.8 or more.

4. The brazing method according to claim 3, wherein a ratio (C1/A) of a volume (C1) of a portion located inside the material to be brazed and located higher than lower ends of side cover portions of the cover member to the volume (A) inside the material to be brazed is 0.8 or more.

5. The brazing method according to claim 3, wherein a ratio (C2/A) of a volume (C2) of a portion located inside the material to be brazed and located lower than upper ends of side cover portions of the cover member to the volume (A) inside the material to be brazed is 0.8 or more.

6. The brazing method according to claim 3, wherein a ratio (C3/A) of a volume (C3) of a portion located inside the material to be brazed and located lower than upper ends of the cover member to the volume (A) inside the material to be brazed is 0.8 or more.

7. The brazing method according to claim 1, wherein the cover member is formed of aluminum or an aluminum alloy, and the heat transmission promoting member is formed of stainless steel, iron, carbon, or ceramics.

8. The brazing method according to claim 7, wherein the aluminum alloy forming the cover member contains Mg.

* * * * *